US 7,685,405 B1

(12) United States Patent
Chow et al.

(10) Patent No.: US 7,685,405 B1
(45) Date of Patent: Mar. 23, 2010

(54) PROGRAMMABLE ARCHITECTURE FOR DIGITAL COMMUNICATION SYSTEMS THAT SUPPORT VECTOR PROCESSING AND THE ASSOCIATED METHODOLOGY

(75) Inventors: Jacky S. Chow, Mountain View, CA (US); Pak Hei Matthew Leung, Shatin (HK); Eugene Yuk-Yin Tang, Richmond Hill (CA)

(73) Assignee: Marvell International Ltd., Hamilton (BM)

(*) Notice: Subject to any disclaimer, the term of this patent is extended or adjusted under 35 U.S.C. 154(b) by 306 days.

(21) Appl. No.: 11/510,246

(22) Filed: Aug. 24, 2006

Related U.S. Application Data

(60) Provisional application No. 60/727,046, filed on Oct. 14, 2005.

(51) Int. Cl.
*G06F 15/76* (2006.01)
(52) U.S. Cl. .......................................... 712/35; 712/34
(58) Field of Classification Search ................. 712/220, 712/246, 34, 35
See application file for complete search history.

(56) References Cited

U.S. PATENT DOCUMENTS

| | | | | |
|---|---|---|---|---|
| 4,135,242 A | * | 1/1979 | Ward et al. .................. | 712/245 |
| 4,785,411 A | * | 11/1988 | Thompson et al. .......... | 708/322 |
| 4,959,779 A | * | 9/1990 | Weber et al. ................. | 711/201 |
| 5,148,447 A | * | 9/1992 | Ito .............................. | 375/221 |
| 5,241,677 A | * | 8/1993 | Naganuma et al. .......... | 718/105 |
| 5,535,240 A | * | 7/1996 | Carney et al. ............... | 375/219 |
| 5,535,406 A | * | 7/1996 | Kolchinsky .................. | 712/10 |
| 5,671,355 A | * | 9/1997 | Collins ....................... | 709/250 |
| 6,121,791 A | * | 9/2000 | Abbott ........................ | 326/39 |
| 6,288,566 B1 | * | 9/2001 | Hanrahan et al. ............. | 326/38 |
| 6,687,821 B1 | * | 2/2004 | Hady et al. .................. | 713/100 |
| 6,813,657 B2 | * | 11/2004 | Kyoung ....................... | 710/52 |
| 2002/0002573 A1 | * | 1/2002 | Landers et al. .............. | 708/501 |
| 2002/0087846 A1 | * | 7/2002 | Nickolls et al. ............. | 712/229 |
| 2004/0001535 A1 | | 1/2004 | Kannan et al. | |
| 2004/0025121 A1 | * | 2/2004 | Hirose et al. .................... | 716/3 |
| 2004/0122880 A1 | | 6/2004 | Van Hoogenbemt et al. | |
| 2004/0203709 A1 | * | 10/2004 | Luneau ..................... | 455/422.1 |
| 2005/0202841 A1 | * | 9/2005 | Brobston et al. .......... | 455/552.1 |
| 2005/0216700 A1 | * | 9/2005 | Honary et al. ................ | 712/15 |
| 2006/0195773 A1 | * | 8/2006 | Pisek et al. .................. | 714/795 |
| 2006/0211387 A1 | * | 9/2006 | Pisek et al. .................. | 455/130 |

OTHER PUBLICATIONS

Maki, G. Whitaker, S. Ganesh, G.; A reconfigurable data path processor; ASIC Conference and Exhibit, 1991. Proceedings., Fourth Annual IEEE International; Publication Date: Sep. 23-27, 1991; On pp. P18-4/1-4.*

(Continued)

*Primary Examiner*—Eddie P Chan
*Assistant Examiner*—Keith Vicary

(57) ABSTRACT

The invention includes an apparatus and the associated method to digitally process data communicated through a communication channel between a transceiver pair. A global control element and programmable algorithm control elements are used to implement an algorithm using a datapath. The control signal outputs of at least one programmable algorithm control element are coupled to the datapath. The datapath may use the control signals to drive transmission data down a computation path that implements the desired algorithm. The datapath may be duplicated to meet the requirements of a particular device and operate on a larger subset of data using the same control signals that are provided by the programmable algorithm control elements.

57 Claims, 11 Drawing Sheets

OTHER PUBLICATIONS

Zhining Huang Sharad, M.; Exploiting operation level parallelism through dynamically reconfigurable datapaths; Design Automation Conference, 2002. Proceedings. 39th; Publication Date: 2002; On pp. 337-342.*

Ning Zhang Brodersen, R.W.; "Architectural evaluation of flexible digital signal processing for wireless receivers"; Signals, Systems and Computers, 2000. Conference Record of the Thirty-Fourth Asilomar Conference on; Publication Date: 2000; vol. 1, On pp. 78-83 vol. 1.*

B Friedrichs, HR Karimi ; Flexible Multi-Standard Terminals for 2nd and 3rd Generation Mobile Systems; ACTS Mobile Telecommunications Summit, Granada-Spain, 1996.*

Brakensiek, J. et al. , Software radio approach for re-configurable multi-standard radios; Personal, Indoor and Mobile Radio Communications, 2002. The 13th IEEE International Symposium on; Publication Date: Sep. 15-18, 2002; vol. 1, On pp. 110-114.*

* cited by examiner

PROGRAMMABLE ARCHITECTURE FOR DIGITAL COMMUNICATION SYSTEMS THAT SUPPORT VECTOR PROCESSING AND THE ASSOCIATED METHODOLOGY

This application claims the benefit of provisional application 60/727,046 filed Oct. 14, 2005, which is hereby incorporated by reference herein in its entirety.

BACKGROUND OF THE INVENTION

This invention relates to programmable transceivers as part of a digital communication system. When designing digital communication systems, it is often difficult to specify a fixed set of transceiver design requirements. The details of the design requirements often depend on the deployment scenario where different deployment scenarios may require transceivers that are compatible with different specifications. These scenarios may include the actual channel characteristics, the noise profile of the link and the usable bandwidth. The lack of such information at design time may either result in an overly-specified design (to fulfill all scenarios) or a design that only works for a limited number of scenarios.

An all digital signal processor (DSP) solution falls into the first category. The flexibility and the re-programmability of such a solution almost guarantees that it will work for many different scenarios. However, an all DSP solution is costly because a great deal of overhead must be built in to provide the degree of flexibility that the DSP can offer. Moreover, with advancements in communication technologies and processing requirement, a single DSP may be insufficient to provide processing power for all potential applications. Interconnecting two or more DSPs can increase the deliverable processing power, but the additional overhead of multiple DSPs can be costly.

The conventional data-flow style transceiver design falls into the second category of design. In such a design, a plurality of blocks are designed and each of the blocks may be used to handle one algorithm of the transceiver system. The blocks are generally connected in a predefined manner. Each block has its own processing resources and cannot be shared among other blocks. The resources therefore cannot be reallocated among all of the blocks if some algorithms require more processing power than anticipated by the original design of the transceiver.

In a block based communication system where signals are processed in chunks, the processing time of the transceiver algorithms are ideally related to the time duration of a block of the communicated data in order to best utilize hardware resources. In the conventional data-flow style transceiver design, each algorithm of the transceiver is implemented by a dedicated block. In such a system, performance of the transceiver is typically improved by increasing the amount of processing resources for the blocks, thereby reducing the amount of time needed to process their associated algorithms. However, reducing processing time, by adding resources, lowers the overall resource utilization of the transceiver.

It would therefore be desirable to provide systems and methods employing a transceiver having a highly scalable programmable processor that maintains high resource utilization.

SUMMARY OF THE INVENTION

In accordance with the present invention, systems and methods for a transceiver having a highly scaleable programmable processor that maintains high resource utilization are provided. A programmable architecture that allows flexible allocation of processing resources among different transceiver algorithms is also provided. This programmable architecture may be used as part of the transceiver or as the whole digital front end of the transceiver. In addition, a method to map the digital processing algorithm into the hardware is also provided.

By employing such a programmable architecture, the utilization of the processing resources can be optimized, thereby requiring fewer processing resources to provide a given amount of processing power. In addition, the latency of the communication system may also be reduced by the programmable architecture. More specifically, the programmable architecture, in accordance with the invention, may use a datapath to receive control signals from one or more algorithm control elements and to operate on a set of data to implement a given algorithm. In other words, a single instruction from the control elements may be used to implement an algorithm on multiple sets of data.

In accordance with some aspects of the present invention, a plurality of processing resources and programmable algorithm control elements are provided. Each of the processing resources includes various computation elements and selectors which guide data through a computation path. A global control element is equipped to select among several programmable algorithm control elements that employ a variety of data processing algorithms in the processing elements. Each of the programmable algorithm control elements is equipped to output control signals, that select the path for the data to follow through the processing resources in order to implement a given algorithm and provide addresses to read and write data to and from memory resources.

In accordance with some aspects of the present invention, the algorithms that the programmable algorithm control elements implement may include, for example, a Fast Fourier Transform (FFT) algorithm, a Channel Equalizer algorithm, and a Cross Talk Cancellation algorithm. The programmability of the invention allows the programmable algorithm control elements to implement a variety of algorithms using the same processing elements. The scalability of the invention allows for the addition of more processing elements to increase the processing power with little or no change to the programmable algorithm control elements.

In accordance with some aspects of the present invention, the processing elements may be complex logic units. In one embodiment, each complex logic unit may be equipped to perform multiply and add operations. In addition, each complex logic unit may be equipped with at least one multiplexor operative to select between two data inputs to output the selected data to the input of a multiplier and/or an adder.

In accordance with some aspects of the present invention, each complex logic unit may be capable of doing one complex butterfly of a radix 4 FFT, 4 complex multiplications, 4 complex multiplications and accumulations, and 8 scalar multiplications and accumulations.

In accordance with some aspects of the present invention, the memory resources may include a memory configured to provide coefficients to the processing elements and a memory used to store communicated user data values.

In accordance with some aspects of the present invention, an input switch network may be used to route data from memory to one or more processing elements.

In accordance with some aspects of the present invention, a bit slicing memory may be operative to select a bit-shifted word size to write to the memory, based on the corresponding algorithm or control signals.

In accordance with some aspects of the present invention, a transceiver system including memory, processing resources, control logic, transmitter and receiver are provided. Data is received by the transceiver through a channel input and is sent through the channel output. Each of the system components may, in some embodiments, communicate with each other to operate on the communicated data.

Further features of the invention, its nature and various advantages, will be more apparent from the accompanying drawings and the following detailed description of the preferred embodiments.

DESCRIPTION OF THE INVENTION

Figure 1:
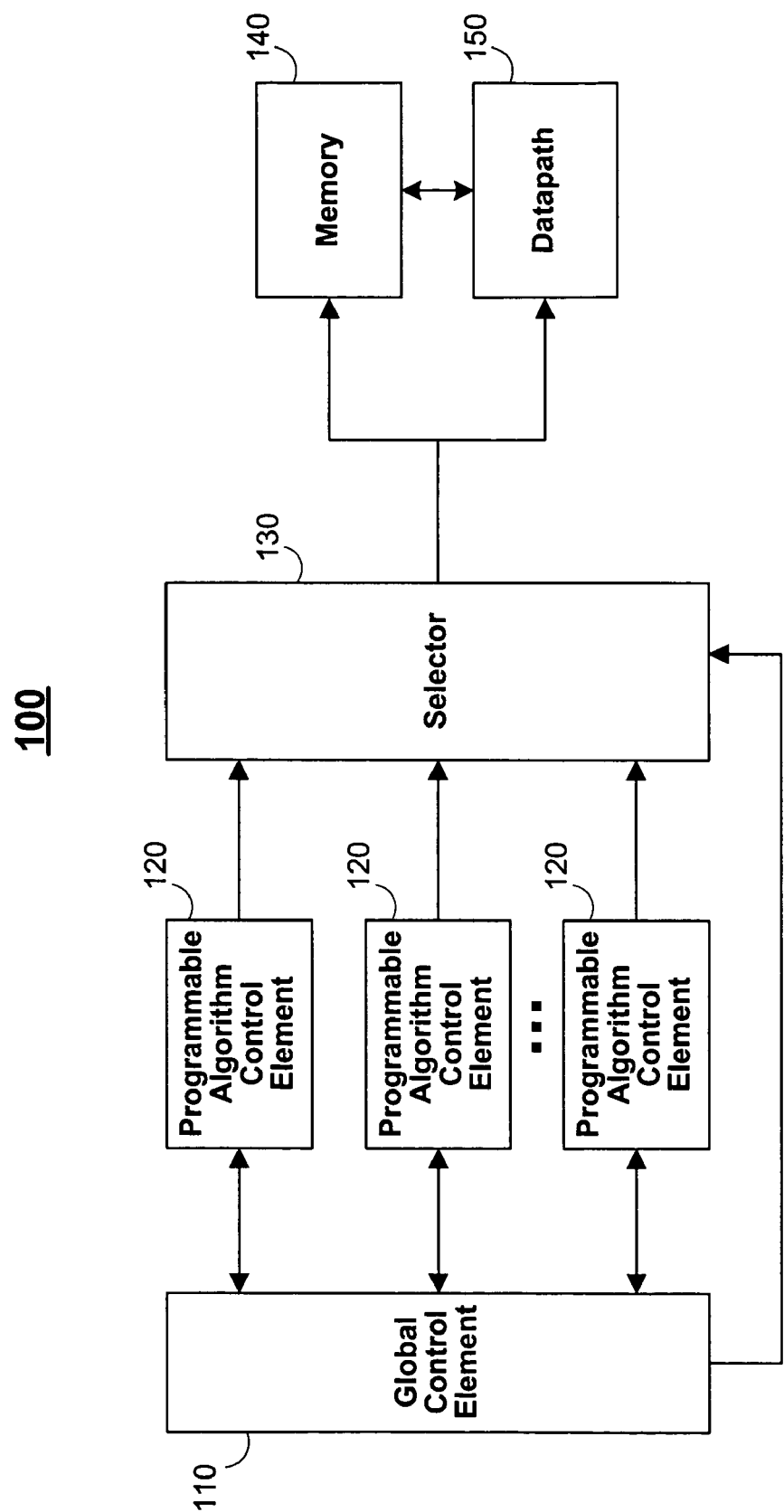
FIG. 1 is an illustrative block diagram of a digital control system in accordance with some aspects of the invention.

FIG. 1 shows an illustrative block diagram of digital control system 100 having system control modules, memory, and a datapath in accordance with one embodiment of the invention. Digital control system 100 includes global control element 110, programmable algorithm control elements 120, selector 130, a datapath 150, and memory 140. This diagram is merely a basic illustration of the system and is being used to simplify the concepts of this invention and should be understood to be arrangeable in different respects and not to limit the teachings of this invention.

Global control element 110 communicates with each of the individual programmable algorithm control elements 120. Global control element 110 may provide signals to one or more of the individual programmable algorithm control elements 120 to start or stop their operations or otherwise affect their logic outputs and may provide a signal to selector 130 to provide the appropriate outputs of programmable algorithm control elements 120 to the rest of the system. One or more individual programmable algorithm control elements 120 may be individually configured to perform one or more functions. The output signals of programmable algorithm control elements 120 are routed to datapath 150 in order to implement a particular algorithm. A more detailed discussion of the interactions between global control element 110 and individual programmable algorithm control elements 120 follows in connection with the description of FIG. 2.

Memory 140 may be configured to store data for one or more algorithms and/or user data. The memory receives address and write/read control signals from the individual programmable algorithm control elements 120. Datapath 150 receives data output from memory 140 and in combination with the control signals received from the individual programmable algorithm control elements 120 performs computations on the data to implement one or more algorithms using one or more processing elements. A more detailed discussion of memory 140 and datapath 150 follows in connection with the description of FIGS. 3 and 4. It should be understood that datapath 150 can be customized for different applications and is not restricted to one particular implementation. In some embodiments, it may even be desirable to configure datapath 150 to solve a different problem. Datapath 150 should be understood to be made up of combinational logic or control logic used to process data along a particular path which may be customized depending on the application.

FIG. 1 shows three individual programmable algorithm control elements 120, however, it should be understood that digital control system 100 may contain any number of individual programmable algorithm control elements. Further each individual programmable algorithm control element 120 is illustrated as receiving individual control signals, however, it should also be understood that all of the individual programmable algorithm control elements 120 may be controlled by a single group of control signals, multiple groups of control signals, or by any suitable combination of control signals. Similarly, datapath 150 and memory 140 are shown to receive individual control signals, however, it should also be understood that datapath 150 and memory 140 may be controlled by a single group of control signals, multiple groups of control signals, or by any suitable combination of control signals.

Figure 2:
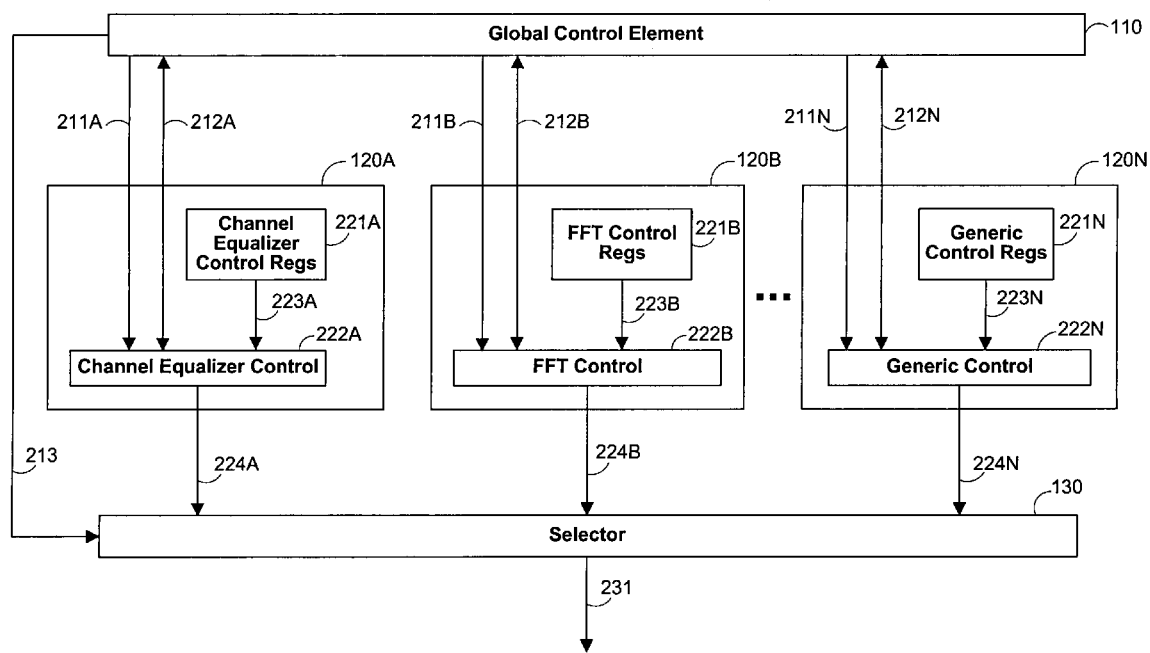
FIG. 2 is an illustrative block diagram showing portions of a digital control system in greater detail in accordance with some aspects of the invention.

FIG. 2 is an illustrative diagram showing in greater detail, portions of digital control system 100. Global control element 110 may function as a master control element by managing the operations of different algorithms that may be implemented within the digital communications system. Global control element 110 may signal one or more of the programmable algorithm control elements 120A-N to begin operating by, for example, setting a start/done signals 212A-N. Signals 212A-N may be used as an enable signal for one or more of programmable algorithm control elements 120A-N in order to initiate their operation. For example, clearing start/done signals 212A-N (i.e., drive the signals with logic 0's) may pause or stop an algorithm that is being implemented by datapath 150. In that situation, programmable algorithm control elements 120A-N may be in the middle of providing control signals to datapath 150 but upon receiving the cleared start/done signals 212A-N, may output a control signal to datapath 150 to stop the operation. This feature may be useful, for example, if global control element 110 requires two or more algorithms to operate on the same or different data sets consecutively.

According to this example, a first programmable algorithm control element 120A may be operating on a first subset of data. At some point later, global control element 110 may clear start/done signal 212A to pause or deactivate first programmable algorithm control element 120A and set start/done signal 212B (i.e., drive the signals with logic 1's) for a second programmable algorithm control element 120B to begin operating on the first or a second subset of data. Start/done signal 212A and 212B may be the same or different for each programmable algorithm control element 120A-N in the system.

Global control element 110, may also provide selector signal 213 to a selector element 130, in order to select which of the programmable algorithm control element outputs 224A-N are to be provided to the memory resources and datapath elements that implement the given algorithm via algorithm control signals 231. For example, if an FFT algorithm is to be implemented, global control element 110 may select the output of FFT programmable algorithm control element 120B as the output to the rest of the system. Each programmable algorithm control element 120A-N may provide its output 224A-N, respectively, to the inputs of selector 130.

For example, if there are five programmable algorithm control elements 120A-N and each has a 32-bit output, where a set of bits corresponds to either memory addresses or datapath operation signals, then selector 130 may be a 5-input by 32-bit multiplexor.

It is important to note that not all of programmable algorithm control elements 120A-N have the same number of output bits. For example, one programmable algorithm control element may only contain 30 output bits while another algorithm control element may contain 32 output bits. In some embodiments, the programmable algorithm control element having 30 output bits may have the missing 2 bits padded (i.e., filled in with 0's or 1's). This way selector 130, or multiplexor, can be a constant size. According to some other embodiments, selector 130 may be configured to receive a variable number of bits at each input. This is one illustration of the flexibility of this system. Additionally, the system is easily scalable such that if more algorithm control elements are desired, they can be added to the system and used to implement other algorithms on datapath 150 with little or no additional hardware.

Global control element 110 may also preferably provide counter signals 211A-N to each of programmable algorithm control elements 120A-N, respectively. Programmable algorithm control elements 120A-N may derive control signals from counter signals 211A-N. For example, counter signal 211A may be used as an input to control logic 222A (which in this case represents channel equalizer control) contained in programmable algorithm control elements 120A. These control signals derived from counter signals 211A-N may also be used to pause, start, or resume operation of the programmable algorithm control elements 120A-N in a similar manner as start/done signals 212A-N. Counter signals 211A-N may be the same or different for each programmable algorithm control elements 120A-N.

Several programmable algorithm control elements 120A-N are shown in FIG. 2. Each of programmable algorithm control elements 120A-N may be equipped to provide the control signals for a particular algorithm using control logic 222A-N, respectively. These control signals control datapath 150 to operate on data in way that implements a particular algorithm. Control logic 222A-N is preferably some simple combinatorial or combinational logic that converts the respective counter signals 211A-N together with the programmable control registers value 221A-N into control signal outputs 224A-N. The control logic 222A-N may also preferably set or clear their respective start/done signals 212A-N to indicate to global control element 110 that an operation has been completed. Output control signals 224A-N may be used to drive selectors in datapath 150 to guide data through a particular path and in turn implement a particular algorithm. These various control signals 224A-N may operate as a single instruction to datapath 150 to process multiple data sets. This will be more apparent in a later discussion in connection with FIGS. 5-7. Moreover, control signals 224A-N may include read addresses that select the inputs to the processing elements, a write address that directs the outputs of the processing elements, operation control signals that configure datapath 150, and one or more precision control signals that determine the range of bits to be written back to memory 140.

While all other elements (i.e., processing elements, memory resources, switch network, registers and accumulators) in the architecture may be shared among all the algorithms, each programmable algorithm control element 120A-N may preferably only be responsible for implementing one individual algorithm (e.g., FFT, channel equalization, or cross talk cancellation) on the system. In some embodiments, one or more programmable algorithm control elements may implement at least two algorithms.

Control registers 221A-N shown in FIG. 2 are used to customize the digital control system. Before each of the algorithms is mapped into the control logic 222A-N, parameters of the algorithms are preferably stored in their respective control registers 221A-N. Such parameters can include, for example, the number of taps of an FIR filter, the number of transmission tones in a discrete multi-tone system, or any other parameters that can be used to cause an algorithm to perform in a particular way. For example, configuring control registers 221A-N in a particular way may cause a control block (i.e., control logic 222A-N) to occupy datapath 150 for a predetermined amount of time. While datapath 150 may be shared among multiple control blocks, if datapath 150 is given a fixed amount of time to process a particular data set (that may pertain to the multiple control blocks) the parameters of each of the multiple control blocks may be modified to enable the multiple control blocks to share datapath 150 in an optimal manner. For example, if control logic 222A requires less amount of processing time than its programmed availability while control logic 222B requires more processing time than its programmed availability, then respective control registers 222A and 222B may be programmed to shift the difference in the control logic 222A required and available processing times from control logic 222A to control logic 222B. By adjusting these parameters, the utilization of the hardware resources may be optimized for a given scenario. These parameter values may be communicated to control logic 222A-N over their respective communication medium 223A-N.

Control registers 221A-N may be used to configure programmable algorithm control elements 120A-N. For example, in one scenario an FFT implemented on a device is required to operate in one way whereas in another scenario the same FFT can be used by the same device, but is required to operate in a slightly different fashion. In such a case, programming control registers 221A-N one way or the other enables the same device (i.e., no changes to the hardware) to meet the requirements of both scenarios.

In addition to programmable algorithm control elements 120A-N that serve predefined algorithms, a generic programmable control element 120N, having generic programmable control registers 221N, and generic control logic unit 222N programmable by control registers 221N may be included in the architecture to provide the flexibility of including more functions when needed. Further, in some embodiments, multiple generic programmable algorithm control elements may be provided to support multiple programmable algorithms. Generic programmable algorithm control element 120N operates to provide control signals 224N to datapath 150 much like the previously discussed programmable algorithm control elements.

Figure 3:
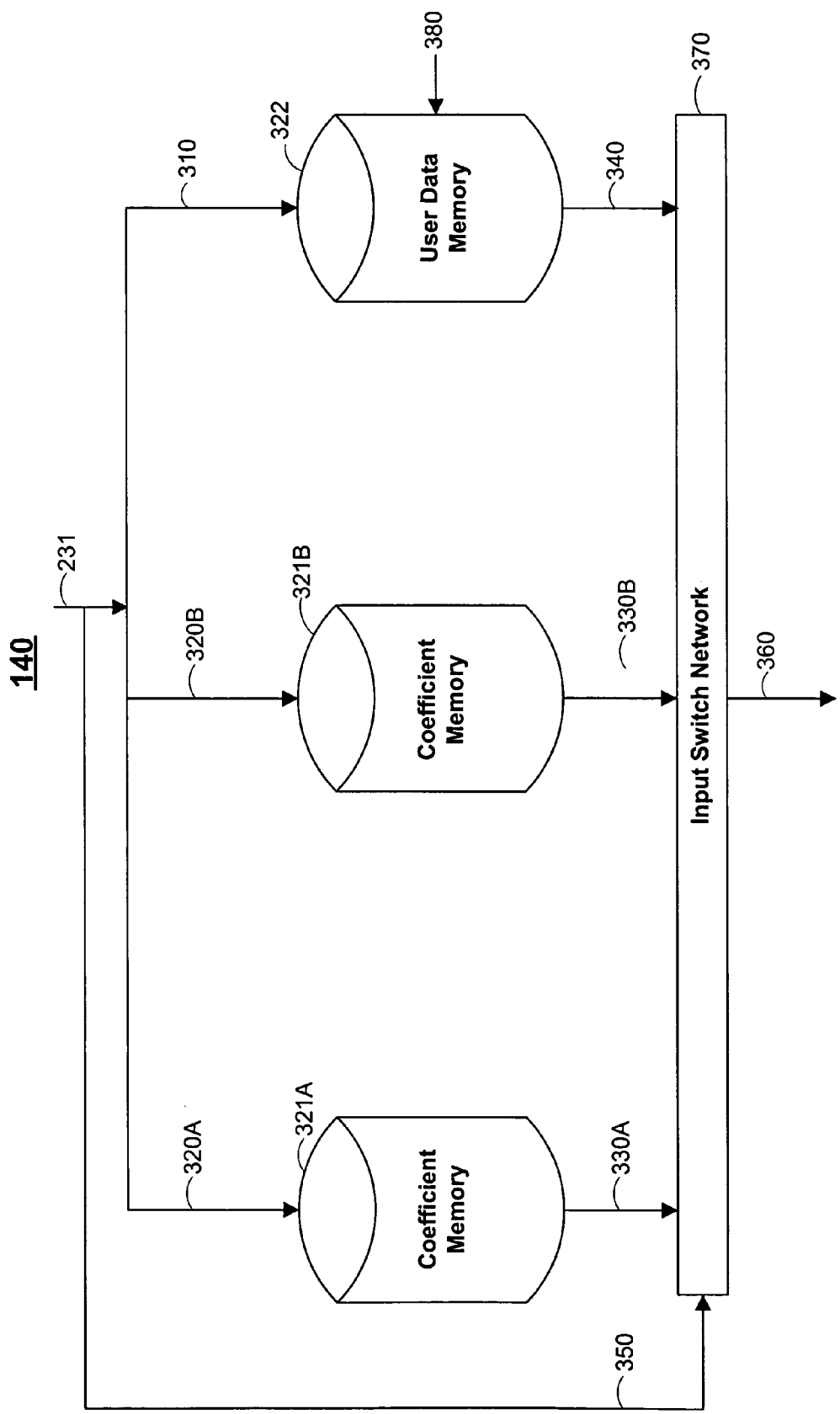
FIG. 3 is an illustrative diagram of memory in accordance with some aspects of the invention.

FIG. 3 is an illustrative diagram of one implementation of memory 140 illustrated in FIG. 1. Two types of memory are shown in FIG. 3. The first type of memory is coefficient memory 321A-B and the second type of memory is user data memory 322. Coefficient memory 321A-B may preferably hold data to help process the data in datapath 150. This data may include, for example, channel information, noise profile, or any other relevant information associated with the transceiver system. This data may be stored in one or more coefficient memories 321A-B. Each of these memories may be shared among various processing resources depending on the requirements of the system. Depending on how the data is being used and processed by datapath 150 (i.e., processing elements), there may be a need for more than one coefficient memory 321 (e.g., FIG. 3 shows two coefficient memories, 321A and 321B). The requirements of the different types of algorithms may determine the number of coefficient memories that may be needed. Furthermore, a single coefficient memory 321 may be capable of providing data storage for two or more algorithms thus being shared by two or more algorithms. One advantage to sharing a single coefficient memory among two or more algorithms is the reduction of fragmentation.

In some embodiments, the contents of coefficient memories 321A-B are pre-determined based on a particular configuration of the transceiver. However, in alternate embodiments, the contents of the coefficient memories 321A-B may be provided by one or more other components of the transceiver system.

Each of the one or more coefficient memories 321A-B and user data memory 322 receive address information from address lines 320A-B and 310, respectively. The address information may be derived from algorithm control signals 231 of selector 130 (FIG. 2). Furthermore, memory resources 321A-B and 322 output data that corresponds to the address information to an input switch network 370 via communication paths 330A-B and 340, respectively. The user data memory 322 may receive data to be written to it via communication path 380.

User data memory 322 may hold data that is communicated via a suitable communications channel or is otherwise provided to the system. User data memory 322 may be both read from, and be written back to, after data has been processed by datapath 150. As illustrated in FIG. 3, there is only one user data memory 322, however it should be understood that several user data memories may be provided, for example, to provide memory configurations suited for different algorithms. Upon performing an operation, data may be read from user data memory 322, processed by datapath 150 (i.e., processing elements) and written back to preferably, the same memory, although one skilled in the art may envision writing to a different memory in order to, for example, preserve the original memory contents.

Input switch network 370 may be responsible for directing the desired data from memories 321A-B and 322 to datapath 150 or processing elements via communications path 360. Due to the many ways in which data from the various memories is directed to the various processing elements, it may not be efficient for input switch network 370 to provide every conceivable routing possibility. Thus, a minimum set of pathways or routings from memories 321A-B and 322 to datapath 150 that can support all the required algorithms may be provided. However, in some embodiments, input switch network 370 may be configurable to provide all or nearly all of these routings in order to maximize the configurability of the system. One of the inputs to input switch network 370 may be an input signal 350 which may be derived from algorithm control signals 231 of selector 130 (FIG. 2). Input signal 350 may be used to configure input switch network 370 to route data in accordance with the selected algorithm or select a particular path for data to follow through input switch network 370 to datapath 150.

Figure 4:
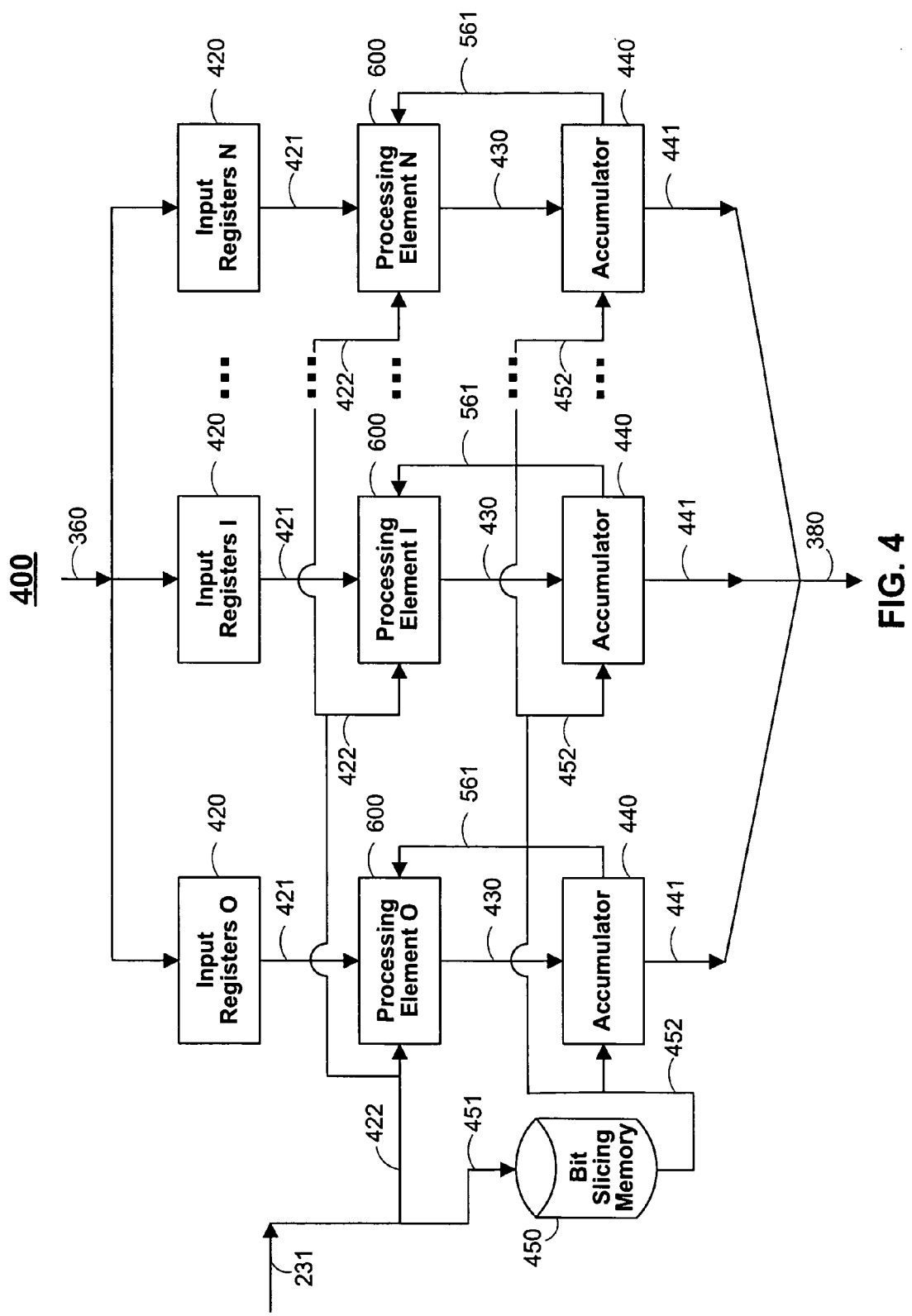
FIG. 4 is an illustrative block diagram of data flow in accordance with some aspects of the invention.

FIG. 4 is an illustrative block diagram 400 of the flow of data through datapath 150 (FIG. 1). Datapath 150 may include a number of input registers 420, followed by complex logic units or processing elements 600 (discussed more in detail in connection with FIG. 5), and accumulators 440. (The term "complex logic unit" is used to refer to an exemplary embodiment of a "processing element" which is described in greater detail in connection with FIGS. 7A and 7B. These terms are used interchangeably in the description and should both be understood to refer to logic devices capable of receiving inputs to control the flow of data through computation resources within the devices.)

Each of the paths through datapath 150 should preferably be identical to enable multiple data processing with a single instruction. In other words, the path through each of input register 420, processing element 600, and accumulator 440 should be the same as the path through every other input register 420, processing element 600, and accumulator 440 in order to provide scalability. For example, if a 4-port device (i.e., modem) needs to be converted to a 16-port device the 4-port device datapath may be duplicated, four times, in order to meet the demands of the new device, without necessitating any major changes to the transceiver hardware design.

The notion of scalability and flexibility becomes even clearer in the discussion of the operation of complex logic units or processing elements 600. All of the processing elements 600 preferably receive the same operation control signal 422, which may be derived from algorithm control signals 231 of selector 130 (FIG. 2). Operation control signals 422 may be coupled to selectors within each of complex logic units or processing elements 600 and operate to guide data through a particular path in processing elements 600. Hence, a single instruction (i.e., operation control signal 422) enables multiple data computation (i.e., same or different data being guided through one or more processing elements 600). For example, according to one implementation described in more detail in FIG. 6, a processing element 600 that is capable of doing one complex butterfly or a radix 4 Fast Fourier Transform (FFT) is shown. In addition, processing element 600 may also perform 4 complex multiplications, 4 complex multiplications and accumulations, and 8 dual scalar multiplications and accumulations. Examples of these operations are provided in a discussion associated with FIGS. 7A and 7B.

Furthermore, each processing element or complex logic unit 600 preferably completes one logic operation (e.g., a multi-taps finite impulse response (FIR) filter or a butterfly calculation of a Fast Fourier Transform (FFT)) within one clock period or cycle. In addition, complex logic unit 600 preferably completes a number of other simpler operations (e.g., scalar/complex number multiplication/addition) in a parallel manner within one clock period. However, it should be understood that in some embodiments processing elements or complex logic units 600 that perform operations in more than one clock cycle may also be provided without departing from the scope and spirit of the present invention.

Moreover, data output 360 from input switch network 370 (FIG. 3) is preferably registered by input registers 420 prior to being input to processing elements 600. This, for example, may ensure that all the data is provided to processing elements 600 at the same clock cycle. The output of input registers 420 is then provided to respective processing elements 600 to be used in the computations of the desired algorithm, selected by global control module 110 (FIG. 1). After processing the data in the processing elements 600 for one or more clock cycles (as discussed above) the data outputs 430 from processing elements 600 are provided to respective accumulators 440. Accumulators 440 (which may be made up of one or more internal accumulators) preferably operate to register data output 430 prior to providing each of their outputs 441 to another system component via communication paths 380. It may be desirable to feedback the registered outputs 441 of accumulators 440 to a respective processing element 600 via a feedback path 561. It should be noted that feedback path 561 may be the same or a different signal than accumulator outputs 441. It may also be desirable to provide the feedback paths 561 to any processing element 600 in the datapath. For example, feedback path 561 that is shown to be connected to processing element 600 (e.g., Processing Element 0) may also or alternatively be connected to processing element 600 (e.g., Processing Element 1).

It should be understood that the configuration of the datapath elements may depend on the type of algorithm that is selected for implementations. For example, one algorithm may be selected that uses one type of processing element 600. At some time later, a second algorithm may be selected that uses a second type of processing element 600. The implementation of the first algorithm may be paused in order to allow the resources in the datapath to be reallocated for the second algorithm. In particular, processing element 600 may be configured to be suitable for the second algorithm. Furthermore, coefficient memory 321 may be configured during the pause to provide data that corresponds to the second algorithm. Depending on the scenario, various datapath resources may be configured and reallocated to suit the needs of different algorithm implementations.

Bit slicing memory 450 receives an input signal 451 that may be derived from algorithm control signals 231 of selector 130 (FIG. 2). Bit slicing memory 450 provides an output 452 to accumulators 440. Bit slicing memory output 452 operates to select the bit-shifted word of the accumulator outputs 441 that are, for example, to be written to user data memory 322 (FIG. 3). The bit slicing memory output 452 may control the way in which the bits of accumulator outputs 441 are shifted to form the output 380. For example, if the word size of user data memory 322 is 16-bits and the accumulators output a word size of 32-bits via accumulator outputs 441, then the bit slicing memory output 452 may operate to select the desired 16-bits to form a datapath output 380.

Figure 5:
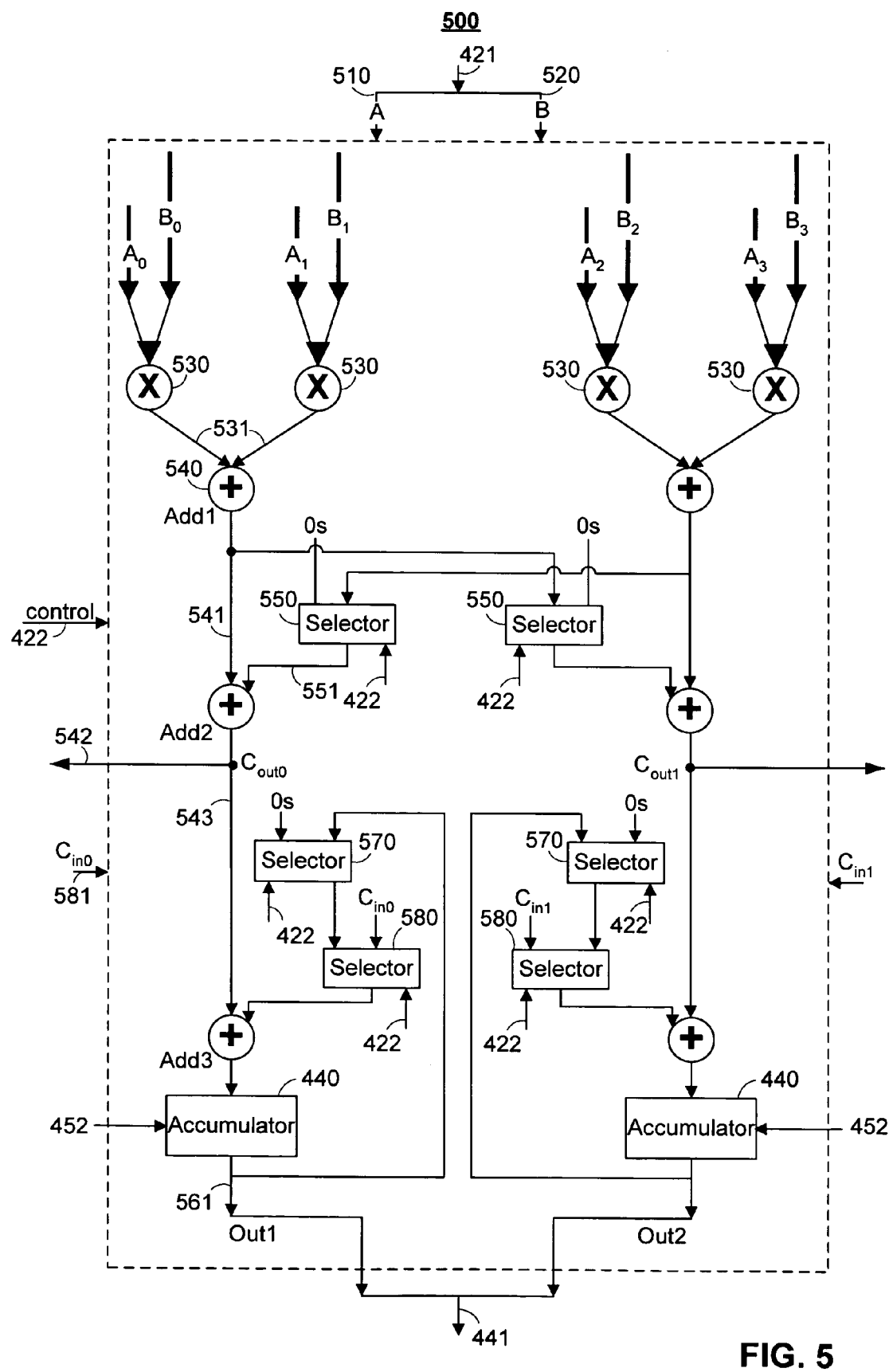
FIG. 5 is an illustrative diagram of data flow through one module of a processing element in accordance with an exemplary embodiment of the invention.

FIG. 5 is an illustrative diagram of data flow through an exemplary module 500 of a complex logic unit 600. The complex logic unit module 500 includes multipliers 530, adders 540, selectors 550, 570, and 580 and accumulators 440 (FIG. 4). The diagram can be seen as two halves, split between two of the four top multipliers 530 and one of the bottom two accumulators 440. Therefore, only half of the diagram corresponding to the complex unit will be discussed.

Two sets of data, 510 (vector A) and 520 (vector B), which may be complex, may flow into the unit from an output 421 of an input registers 420 (FIG. 4). As shown in the top of the diagram, a first subset of vector A ($A_0$) is multiplied with a first subset of vector B ($B_0$). At the same time or at some point later a second subset of each ($A_1$ and $B_1$) may be multiplied. The results 531 are provided to adder 540 (Add1).

The Add1 output 541 may be coupled to a subsequent adder (Add2). Additionally, Add1 output 541 is coupled to a selector 550 of the second half of the module 500. Similarly, the Add1 output from the second half of module 500 is coupled to corresponding selector 550 of the first half. Control signals 422 operate to guide data through the processing element or in this example, module 500 of the complex logic unit. In particular, control signals 422 may operate to select between one of the Add1 outputs of the opposite half of the module and a constant input, such as for example, 0. The selector output 551 is coupled to Add2.

Add2 operates to sum Add1 output and selector 550 output. This arrangement may cause the Add2 output 543 (Cout0) to either be the sum of both Add1 outputs of both halves (if control signals 422 select Add1 output from the opposite half as the output) or simply the output of Add1 (if control signals 422 select for example, 0 as the output of the selector).

In either case Cout0 may be provided as an output 542 of the module to couple to a corresponding input 581 (Cin0) of another module of the complex logic unit and can also be coupled to another adder (Add3).

Two additional selectors, 570 and 580, may be provided in this module. Selector 570 may select between the feedback path 561 of accumulator 440 and a constant value. Selector 580 may select between the output of selector 570 and Cin0 input from another module. The output of selector 580 is coupled to Add3 which provides its output to accumulator 440. In the bottom portion of the diagram, accumulator feedback path 561 may be provided back to module 500 of the complex logic unit or as processing element output 441.

Figure 6:
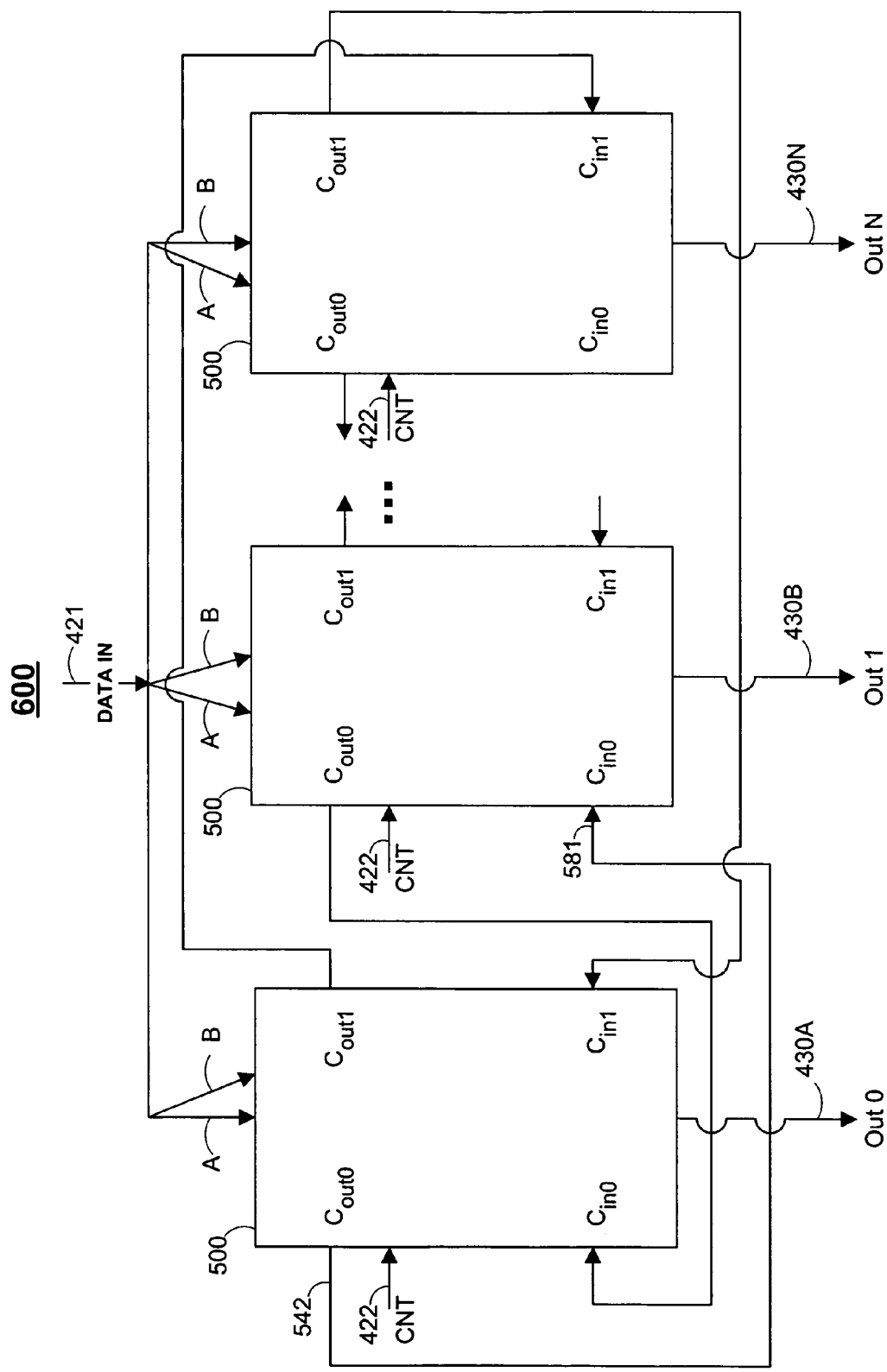
FIG. 6 is an illustrative block diagram of data flow through several modules of a processing element in accordance with an exemplary embodiment of the invention.

FIG. 6 shows an example of several complex logic unit modules 500 (FIG. 5) coupled together to form one complex logic unit 600 (FIG. 4). Although FIG. 6 only shows three complex logic unit modules 500, any number of these modules may be coupled together in a similar fashion to meet the demands of any given scenario.

Data input 421 having portions A and B is received from the output of an input register 420 (FIG. 4) and is coupled to each of the modules 500 in the datapath portion. Each module 500 receives the same or different control signals 422 (FIG. 4) which may be coupled to the selectors within the modules to guide the data through a particular computation path.

$C_{out0}$ 542 from the first module 500 is coupled to $C_{in0}$ 581 of the second module 500. Similarly, $C_{out1}$ the first module 500 is coupled to $C_{in1}$ of another module 500. The connections described above and shown in the figure are merely exemplary and should be understood to be capable of being modified to be connected in any suitable combination. The remaining connections are exemplary and for brevity will not be described. The outputs of each module 500 ranges from Out0 through OutN to provide an overall output 430 to the remaining portion of the datapath, for example, accumulator 440 (FIG. 4).

Figure 7A:
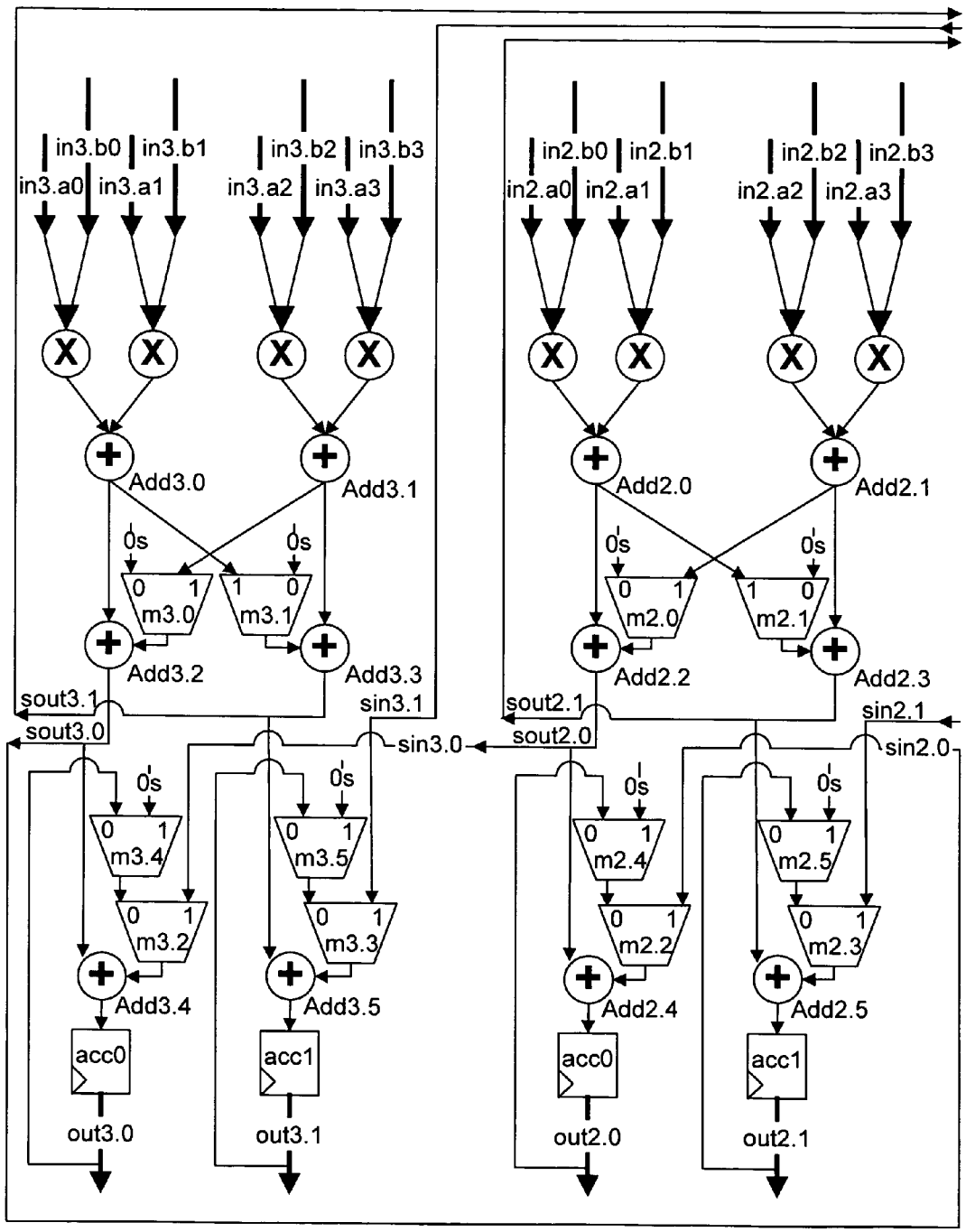
FIGS. 7A and 7B are more detailed diagrams of data flow through four modules of a processing element in accordance with some aspects of the invention.
Figure 7B:
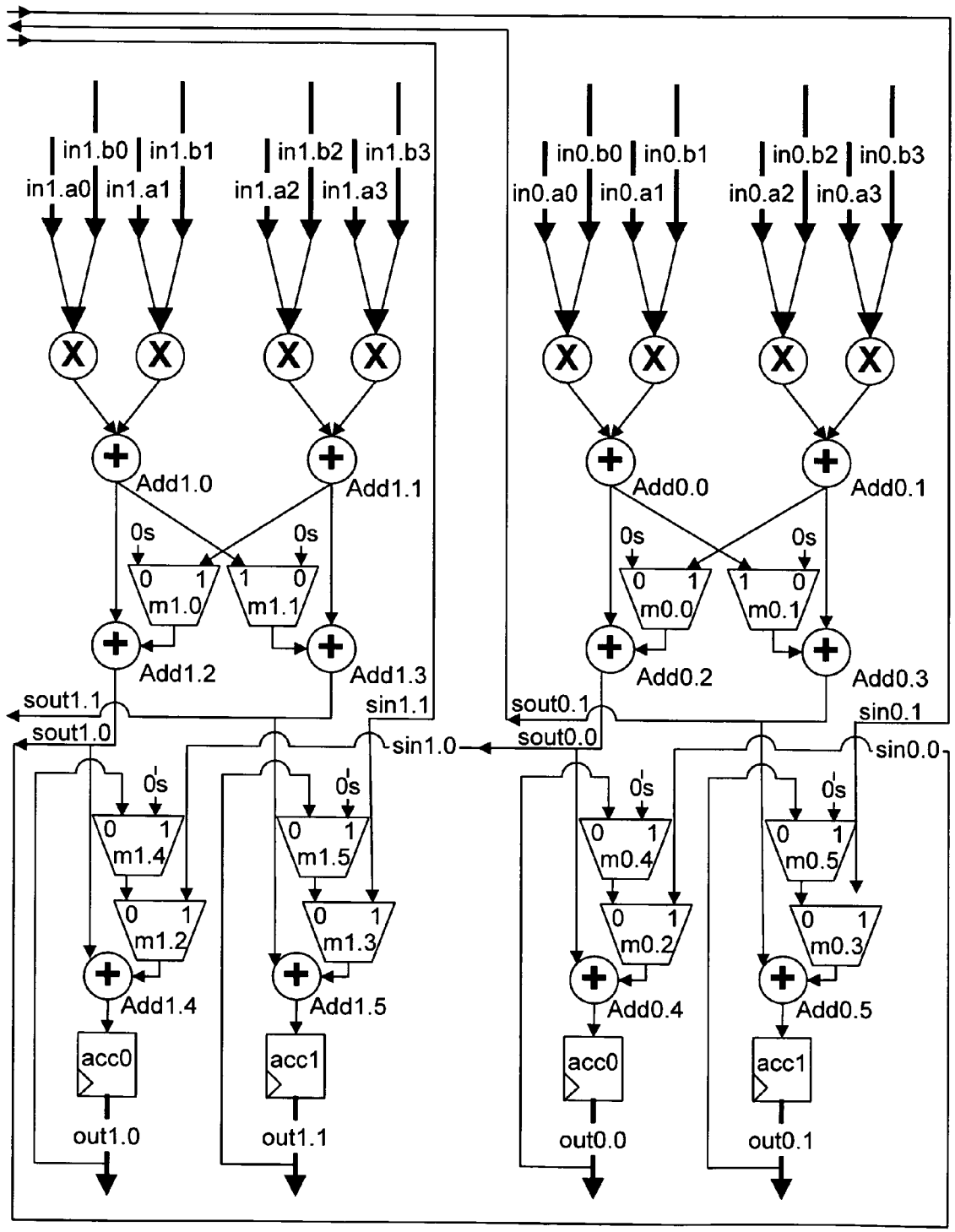

FIGS. 7A and 7B show an illustration of one exemplary type of processing element 600 that may be used in datapath 150. In particular, a more detailed diagram of complex logic subunits 700A and 700B, or together unit 700, having four interconnected complex logic units 500 is shown. Unit 700 can be viewed as 4 sub-units where each of the sub-units contains 4 multipliers, 6 adders and 2 accumulators. Each of these 4 sub-units can be capable of handling one complex multiply and accumulate operation or 2 parallel dual scalar multiply and accumulate operations. Each of these sub-units can be labeled with a number ranging from 3 to 0 starting from the first sub-unit of 700A. Each of the adders, multiplexors (muxes) and ports are also labeled. The labels are shown to start with the operation or the port type, followed by the sub-unit number and then an index. The operation and port type can be one of the following: Add—adders, M—muxes, in—input, out—output, sin—input from other sub-unit, sout—output to other sub-unit. The adders, despite the name, can behave either as a subtractor or an adder. By interconnecting the 4 sub-units as shown, the unit can behave as a radix-4 FFT butterfly unit. Exemplary settings for the control signals are shown below which may be provided by an individual programmable algorithm control element 120 (FIG. 1) output. The control signals determine each of the operations that are used to implement a particular algorithm:

Example Algorithm 1

8 dual scalar multiply and accumulate operations (ouputx=in.a0.x*in.b0.x+in.a1.x*in.b1.x+acc.x):

Input Settings:

| | | | |
|---|---|---|---|
| in3.a0 = in.a0.7 | in2.a0 = in.a0.5 | in1.a0 = in.a0.3 | In0.a0 = in.a0.1 |
| in3.a1 = in.a1.7 | in2.a1 = in.a1.5 | in1.a1 = in.a1.3 | In0.a1 = in.a1.1 |
| in3.a2 = in.a0.6 | in2.a2 = in.a0.4 | in1.a2 = in.a0.2 | In0.a2 = in.a0.0 |
| in3.a3 = in.a1.6 | in2.a3 = in.a1.4 | in1.a3 = in.a1.2 | In0.a3 = in.a1.0 |
| in3.b0 = in.b0.7 | in2.b0 = in.b0.5 | in1.b0 = in.b0.3 | In0.b0 = in.b0.1 |
| in3.b1 = in.b1.7 | in2.b1 = in.b1.5 | in1.b1 = in.b1.3 | In0.b1 = in.b1.1 |
| in3.b2 = in.b0.6 | in2.b2 = in.b0.4 | in1.b2 = in.b0.2 | In0.b2 = in.b0.0 |
| in3.b3 = in.b1.6 | in2.b3 = in.b1.4 | in1.b3 = in.b1.2 | In0.b3 = in.b1.0 |

Operation Settings:

| | | | |
|---|---|---|---|
| Add3.0 -> add | Add2.0 -> add | Add1.0 -> add | Add0.0 -> add |
| Add3.1 -> add | Add2.1 -> add | Add1.1 -> add | Add0.1 -> add |
| Add3.2 -> add | Add2.2 -> add | Add1.2 -> add | Add0.2 -> add |
| Add3.3 -> add | Add2.3 -> add | Add1.3 -> add | Add0.3 -> add |
| Add3.4 -> add | Add2.4 -> add | Add1.4 -> add | Add0.4 -> add |
| Add3.5 -> add | Add2.5 -> add | Add1.5 -> add | Add0.5 -> add |
| m3.0 -> select 0 | m2.0 -> select 0 | m1.0 -> select 0 | M0.0 -> select 0 |
| m3.1 -> select 0 | m2.1 -> select 0 | m1.1 -> select 0 | m0.1 -> select 0 |
| m3.2 -> select 0 | m2.2 -> select 0 | m1.2 -> select 0 | m0.2 -> select 0 |
| m3.3 -> select 0 | m2.3 -> select 0 | m1.3 -> select 0 | m0.3 -> select 0 |
| m3.4 -> select 0 | m2.4 -> select 0 | m1.4 -> select 0 | m0.4 -> select 0 |
| m3.5 -> select 0 | m2.5 -> select 0 | m1.5 -> select 0 | m0.5 -> select 0 |

Output Settings:

| | | | |
|---|---|---|---|
| out3.0 = output.7 | out2.0 = output.7 | out1.0 = output.7 | out0.0 = output.7 |
| out3.1 = output.6 | out2.1 = output.6 | out1 = output.6 | Out0.1 = output.6 |

Example Algorithm 2:

4 complex multiply operations:

(ouput.Re.x=in.aRe.x*in.bRe.x−in.aIm.x*in.bim.x
ouput.Im.x=in.aRe.x*in.bim.x+in.aIm.x*in.bRe.x)

Input Settings:

| | | | |
|---|---|---|---|
| in3.a0 = in.aRe.3 | in2.a0 = in.aRe.2 | in1.a0 = in.aRe.1 | in0.a0 = in.a0.1 |
| in3.a1 = in.aIm.3 | in2.a1 = in.aIm.2 | in1.a1 = in.aIm.1 | in0.a1 = in.a1.1 |
| in3.a2 = in.aRe.3 | in2.a2 = in.aRe.2 | in1.a2 = in.aRe.1 | in0.a2 = in.a0.0 |
| in3.a3 = in.aIm.3 | in2.a3 = in.aIm.2 | in1.a3 = in.aIm.1 | in0.a3 = in.a1.0 |
| in3.b0 = in.bRe.3 | in2.b0 = in.bRe.2 | in1.b0 = in.bRe.1 | in0.b0 = in.b0.1 |
| in3.b1 = in.bIm.3 | in2.b1 = in.bIm.2 | in1.b1 = in.bIm.1 | in0.b1 = in.b1.1 |
| in3.b2 = in.bIm.3 | in2.b2 = in.bIm.2 | in1.b2 = in.bIm.1 | in0.b2 = in.b0.0 |
| in3.b3 = in.bRe.3 | in2.b3 = in.bRe.2 | in1.b3 = in.bRe.1 | in0.b3 = in.b1.0 |

Operation Settings:

| | | | |
|---|---|---|---|
| Add3.0 -> subtract | Add2.0 -> subtract | Add1.0 -> subtract | Add0.0 -> subtract |
| Add3.1 -> add | Add2.1 -> add | Add1.1 -> add | Add0.1 -> add |
| Add3.2 -> add | Add2.2 -> add | Add1.2 -> add | Add0.2 -> add |
| Add3.3 -> add | Add2.3 -> add | Add1.3 -> add | Add0.3 -> add |
| Add3.4 -> add | Add2.4 -> add | Add1.4 -> add | Add0.4 -> add |
| Add3.5 -> add | Add2.5 -> add | Add1.5 -> add | Add0.5 -> add |
| m3.0 -> select 0 | m2.0 -> select 0 | m1.0 -> select 0 | M0.0 -> select 0 |
| m3.1 -> select 0 | m2.1 -> select 0 | m1.1 -> select 0 | M0.1 -> select 0 |
| m3.2 -> select 0 | m2.2 -> select 0 | m1.2 -> select 0 | m0.2 -> select 0 |
| m3.3 -> select 0 | m2.3 -> select 0 | m1.3 -> select 0 | m0.3 -> select 0 |
| m3.4 -> select 1 | m2.4 -> select 1 | m1.4 -> select 1 | m0.4 -> select 1 |
| m3.5 -> select 1 | m2.5 -> select 1 | m1.5 -> select 1 | m0.5 -> select 1 |

Output Settings:

| | | | |
|---|---|---|---|
| out3.0 = output.Re.3 | out2.0 = output.Re.2 | out1.0 = output.Re.1 | Out0.0 = output.Re.0 |
| out3.1 = output.Im.3 | out2.1 = output.Im.2 | out1.1 = output.Im.1 | Out0.1 = output.1m.0 |

Example Algorithm 3:

4 complex multiply and accumulate operations:

(ouput.Re.x=in.aRe.x*in.bRe.x−in.aIm.x*in.blm.x+acc.Re.x ouput.Im.x=in.aRe.x*in.blm.x+in.aIm.x*in.bRe.x+acc.Im.x)

Input Settings:

| | | | |
|---|---|---|---|
| in3.a0 = in.aRe.3 | in2.a0 = in.aRe.2 | m1.a0 = in.aRe.1 | in0.a0 = in.a0.1 |
| in3.a1 = in.aIm.3 | in2.a1 = in.aIm.2 | in1.a1 = in.aIm.1 | in0.a1 = in.a1.1 |
| in3.a2 = in.aRe.3 | in2.a2 = in.aRe.2 | in1.a2 = in.aRe.1 | in0.a2 = in.a0.0 |
| in3.a3 = in.aIm.3 | in2.a3 = in.aIm.2 | in1.a3 = in.aIm.1 | in0.a3 = in.a1.0 |

-continued

| | | | |
|---|---|---|---|
| in3.b0 = in.bRe.3 | in2.b0 = in.bRe.2 | in1.b0 = in.bRe.1 | in0.b0 = in.b0.1 |
| in3.b1 = in.bIm.3 | in2.b1 = in.bIm.2 | in1.b1 = in.bIm.1 | in0.b1 = in.b1.1 |
| in3.b2 = in.bIm.3 | in2.b2 = in.bIm.2 | in1.b2 = in.bIm.1 | in0.b2 = in.b0.0 |
| in3.b3 = in.bRe.3 | in2.b3 = in.bRe.2 | in1.b3 = in.bRe.1 | in0.b3 = in.b1.0 |

Operation Settings:

| | | | |
|---|---|---|---|
| Add3.0 -> subtract | Add2.0 -> subtract | Add1.0 -> subtract | Add0.0 -> subtract |
| Add3.1 -> add | Add2.1 -> add | Add1.1 -> add | Add0.1 -> add |
| Add3.2 -> add | Add2.2 -> add | Add1.2 -> add | Add0.2 -> add |
| Add3.3 -> add | Add2.3 -> add | Add1.3 -> add | Add0.3 -> add |
| Add3.4 -> add | Add2.4 -> add | Add1.4 -> add | Add0.4 -> add |
| Add3.5 -> add | Add2.5 -> add | Add1.5 -> add | Add0.5 -> add |
| m3.0 -> select 0 | m2.0 -> select 0 | m1.0 -> select 0 | m0.0 -> select 0 |
| m3.1 -> select 0 | m2.1 -> select 0 | m1.1 -> select 0 | m0.1 -> select 0 |
| m3.2 -> select 0 | m2.2 -> select 0 | m1.2 -> select 0 | m0.2 -> select 0 |
| m3.3 -> select 0 | m2.3 -> select 0 | m1.3 -> select 0 | m0.3 -> select 0 |
| m3.4 -> select 0 | m2.4 -> select 0 | m1.4 -> select 0 | m0.4 -> select 0 |
| m3.5 -> select 0 | m2.5 -> select 0 | m1.5 -> select 0 | m0.5 -> select 0 |

Output Settings:

| | | | |
|---|---|---|---|
| out3.0 = output.Re.3 | out2.0 = output.Re.2 | out1.0 = output.Re.1 | Out0.0 = output.Re.0 |
| out3.1 = output.Im.3 | out2.1 = output.Im.2 | out1.1 = output.Im.1 | Out0.1 = output.Im.0 |

Example Algorithm 4:

radix-4 FFT butterfly operation:

(ouput.X.0=in.F.0+in.F.1*in.W.1+in.F.2*in.W.2+in.F.3*in.W.3   ouput.X.1=in.F.0−j*in.F.1*   in.W.1−in.F.2*in.W.2+j*in.F.3*in.W.3   ouput.X.2=in.F.0−in.F.1*in.W.1+in.F.2*in.W.2−in.F.3*in.W.3   ouput.X.3=in.F.0+j*in.F.1* in.W.1−in.F.2*in.W.2−j*in.F.3*in.W.3)

where all terms can be complex and can be broken into the real and imaginary part (Re and Im)

Input Settings:

| | | | |
|---|---|---|---|
| in3.a0 = in.FRe.2 | in2.a0 = in.FRe.1 | in1.a0 = in.FRe.2 | in0.a0 = in.FRe.1 |
| in3.a1 = in.FIm.2 | in2.a1 = in.FIm.1 | in1.a1 = in.FIm.2 | in0.a1 = in.FIm.1 |
| in3.a2 = in.FRe.0 | in2.a2 = in.FRe.3 | in1.a2 = in.FIm.0 | in0.a2 = in.FRe.3 |
| in3.a3 = 0 | in2.a3 = in.FIm.3 | in1.a3 = 0 | in0.a3 = in.FIm.3 |
| in3.b0 = in.WRe.2 | in2.b0 = in.WIm.1 | in1.b0 = in.WIm.2 | in0.b0 = in.WIm.1 |
| in3.b1 = in.WIm.2 | in2.b1 = in.WIm.1 | in1.b1 = in.WRe.2 | in0.b1 = in.WRe.1 |
| in3.b2 = 1 | in2.b2 = in.WRe.3 | in1.b2 = 1 | in0.b2 = in.WIm.3 |
| in3.b3 = 0 | in2.b3 = in.WIm.3 | in1.b3 = 0 | in0.b3 = in.WRe.3 |

Operation Settings:

| | | | |
|---|---|---|---|
| Add3.0 -> subtract | Add2.0 -> subtract | Add1.0 -> add | Add0.0 -> add |
| Add3.1 -> add | Add2.1 -> subtract | Add1.1 -> add | Add0.1 -> subtract |
| Add3.2 -> add | Add2.2 -> add | Add1.2 -> add | Add0.2 -> add |
| Add3.3 -> subtract | Add2.3 -> subtract | Add1.3 -> subtract | Add0.3 -> subtract |
| Add3.4 -> add | Add2.4 -> subtract | Add1.4 -> add | Add0.4 -> subtract |
| Add3.5 -> add | Add2.5 -> add | Add1.5 -> add | Add0.5 -> add |
| m3.0 -> select 1 | m2.0 -> select 1 | m1.0 -> select 1 | M0.0 -> select 1 |
| m3.1 -> select 1 | m2.1 -> select 1 | m1.1 -> select 1 | m0.1 -> select 1 |
| m3.2 -> select 1 | m2.2 -> select 1 | m1.2 -> select 1 | m0.2 -> select 1 |
| m3.3 -> select 1 | m2.3 -> select 1 | m1.3 -> select 1 | m0.3 -> select 1 |
| m3.4 -> select 1 | m2.4 -> select 1 | m1.4 -> select 1 | m0.4 -> select 1 |
| m3.5 -> select 1 | m2.5 -> select 1 | m1.5 -> select 1 | m0.5 -> select 1 |

Output Settings:

| | | | |
|---|---|---|---|
| out3.0 = output.XRe.0 | out2.0 = output.XRe.2 | out1.0 = output.XIm.0 | out0.0 = output.XIm.2 |
| out3.1 = output.XRe.1 | out2.1 = output.XIm.3 | out1.1 = outputXIm.1 | Out0.1 = output.XRe.3 |

It should be noted that the above operations are just illustrative examples of the operations that can be performed by the complex logic units. The actual supported operations should not be restricted to the operations listed above. For example, the processing elements or complex logic units can merely be an ALU that receives any number of data inputs and based on the control signals can output a corresponding operation, that can result in the implementation of a selected algorithm.

Figure 8:
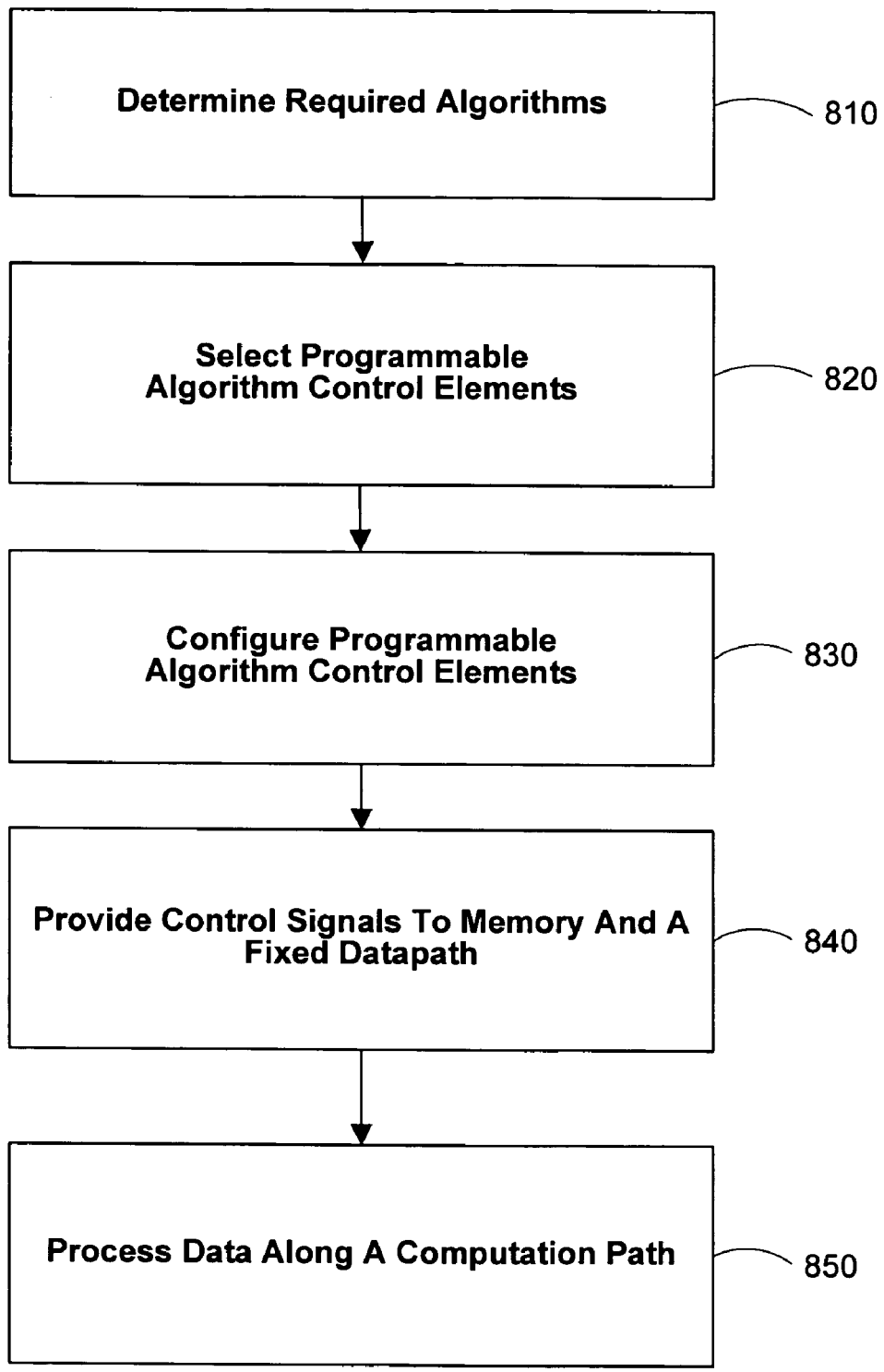
FIGS. 8 and 9 are flow diagrams of an illustrative method of processing data in accordance with some aspects of the invention.

FIG. 8 illustrates a flow diagram of a method of providing algorithm control signals to a fixed datapath in accordance with one embodiment of the invention. At step 810, the algorithms required by the transceiver system are determined. These algorithms may be any suitable algorithm that may be implemented by the fixed datapath receiving the control signals. For example, the algorithms can be FFT, Channel Equalizer, Cross Talk Cancellation, or any combination of the same or different algorithms used to process communication signals or other data.

At step 820, programmable algorithm control elements 120 (FIG. 1) are selected to provide algorithm control signals to datapath 150. Each programmable algorithm control element 120 may provide control signals to selector 130 which is controlled by global control element 110 (FIG. 1). Global control element 110 may select a given algorithm to implement on datapath 150 based on the system requirements or any other predetermined condition.

At step 830, the corresponding control logic registers 221 (FIG. 2) are configured to enable the required algorithms to be implemented. Preferably, each algorithm control logic 222A-N (FIG. 2) has its own control logic registers 221A-N. Where multiple algorithms are required, a multiple set of control logic registers 221A-N may preferably be configured. Additionally, if the algorithms require coefficients, then coefficient memory 321A-B (FIG. 3) may be configured. At step 840, control signals are provided to the memory and the fixed datapath by the selected programmable algorithm control element(s) to implement a desired algorithm.

At step 850, the algorithm is implemented by processing data along a computation path in the fixed datapath, much like the one shown in FIGS. 4 and 5. A further discussion of this is provided in connection with the description of FIG. 9.

Figure 9:
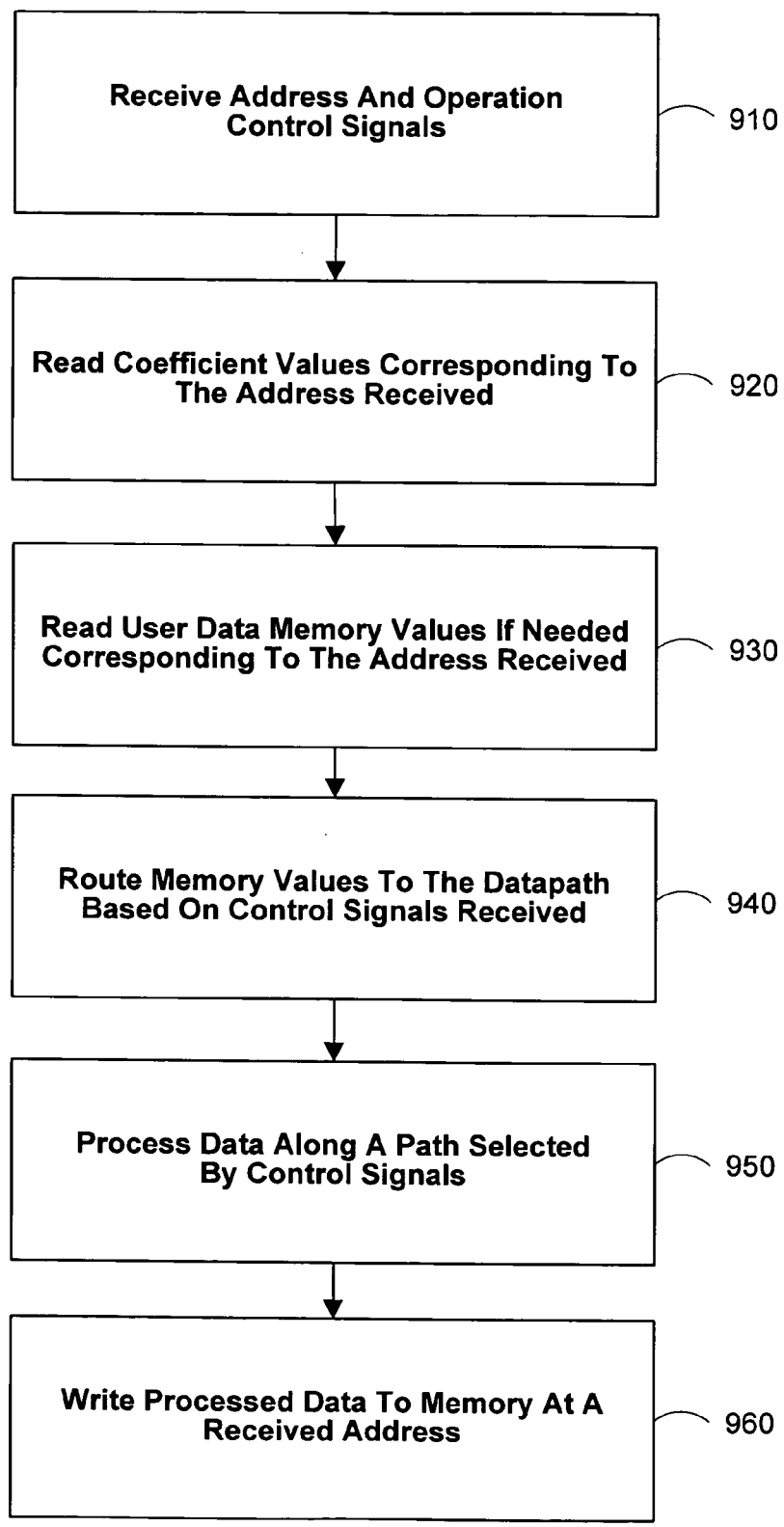

FIG. 9 is a flow diagram of method of operating a fixed datapath using a set of received algorithm control signals in accordance with one embodiment of the invention.

At step 910, algorithm control signals 231 (FIG. 2) (i.e., address and operation control signals) may be received. These signals are used to read/write to memory addresses and guide data along a particular computation path through datapath 150 or processing elements, much like the one shown in FIGS. 4 and 5.

At step 920, coefficient memory values may be read from coefficient memories 321A-B (FIG. 3) if needed. Control signals 320A-B may be used to determine a particular coefficient memory address and the associated coefficient values that are to be read from that address. These values may be provided to datapath elements through input switch network 370 (FIG. 3), or in some other embodiments, directly to the appropriate processing elements.

At step 930, user data values that correspond to an address that are received from the control signals may be read from user data memory 322 (FIG. 3). If these values are needed, they may be provided to datapath 150 elements through input switch network 370, or in some other embodiments, directly to the appropriate processing elements 600 (FIG. 4).

At step 940, the memory values that were read from coefficient memories 321A-B and user data memory 322, are routed to one or more datapath elements (e.g., input registers 420, processing elements 600) based on the operation control signals 231 (FIG. 4) that are received. For example, if there are two memory resources (e.g., 321A and 321B shown in FIG. 3) and two datapath columns (e.g., one column of input registers 420, processing element 600, and accumulator 440; and a second column of input registers 420, processing element 600, and accumulator 440 shown in FIG. 4), input switch network 370 (FIG. 3) can route data from one of the memory (e.g., 321A) to one or both datapath columns or in other embodiments route data from one memory (e.g., 321A) to one datapath column and data from a second memory resource (e.g., 321B) to another of datapath 150 columns depending on operation control signals 231 that are received.

At step 950, the data is processed by one or more processing elements 600 (FIG. 4). Operation control signals 231 determine how the data will flow through the processing elements. For example, the selectors within each of the processing elements (e.g., selectors 550, 570, and 580 shown in FIG. 5) may be coupled to the operation control signals 422 to select between data inputs and constant value inputs. These select signals determine the type of mathematical operation that the processing elements implement. Hence, depending on the algorithm that is selected, the control signals for the selected algorithm may control the implementation of the algorithm through the processing elements.

At step 960, the processed data 380 (FIGS. 3 and 4) may be written to user data memory 322 (FIG. 3) at the addresses given using the appropriate control signals 310.

One skilled in the art will appreciate that these steps are merely illustrative and can each be skipped or be performed in any order not described above for brevity. For example, coefficient memories 321A-B may be read from or written to, after or before, user data memory 322 is read from or written to.

Figure 10:
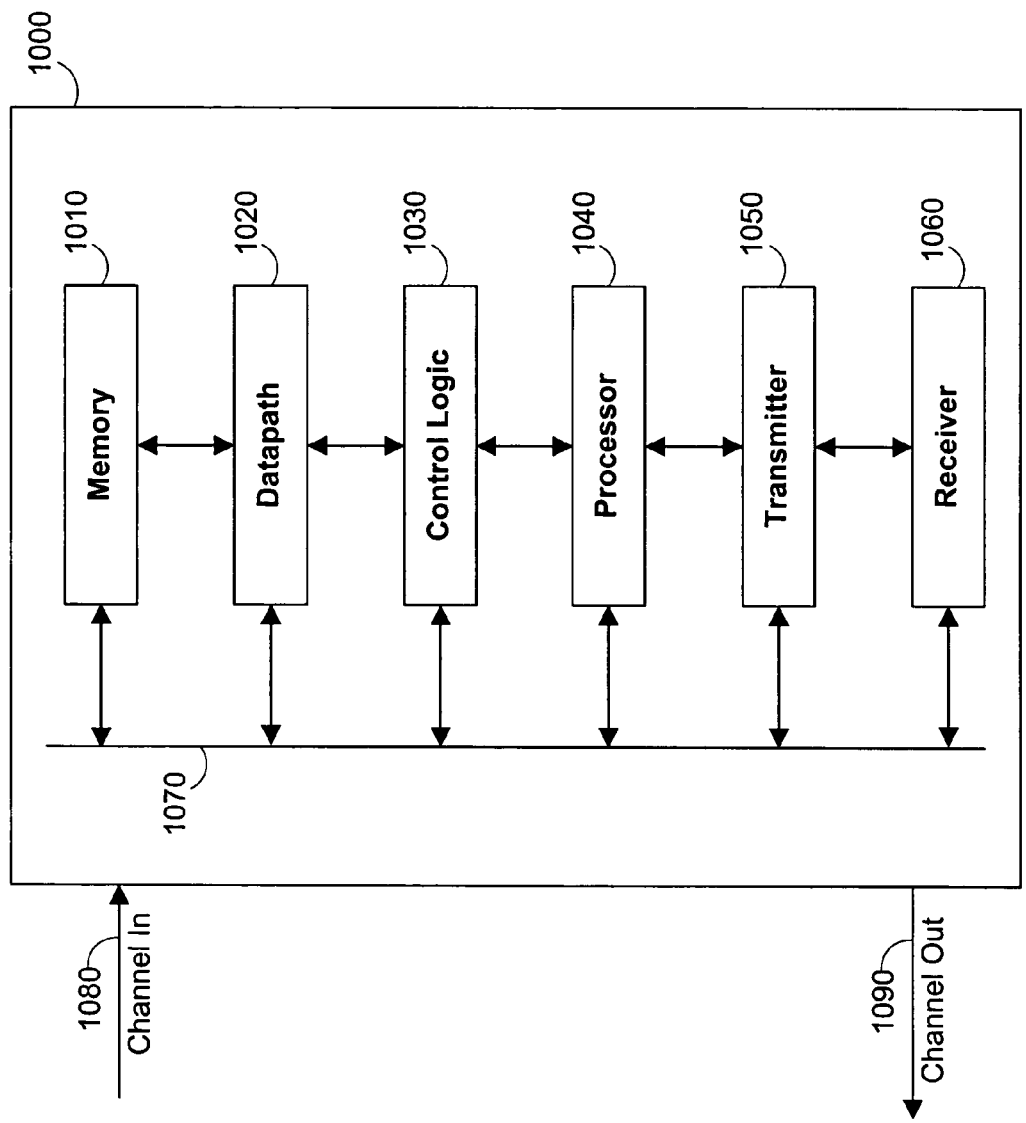
FIG. 10 is an illustrative block diagram of a transceiver system employing the controllers and processing elements in accordance with some aspects of the invention.

FIG. 10 is an illustration of a transceiver system 1000 employing global control element 110 and programmable algorithm control elements (120) and fixed datapath 150. The transceiver system 1000 includes a memory 1010, a datapath 1020, control logic 1030, a processor 1040, a transmitter and receiver, 1050 and 1060, and channel in and channel out 1080 and 1090 respectively.

A bus 1070 is shown that can be used to communicate data from any one of the elements of the system to any of the other elements in the system. For example, memory 1010 may communicate data to datapath 1020 either directly or via bus 1070. Similarly, control logic 1030 may communicate control signals directly or via bus 1070. In order to avoid overcrowding the drawing, dedicated connections are illustrated between adjacent blocks (i.e., a direct connection between datapath 1020 and memory 1010 and control logic 1030), however it should be understood that any block may have a dedicated connection to any other block in order to avoid consuming the bandwidth of bus 1070 (e.g., memory 1010 may have a dedicated connection to control logic 1030).

Data can enter transceiver 1000 via channel in 1080 to receiver 1060. Receiver 1060 may place the data in condition for processing by any of processor 1040, control logic 1030, datapath 1020, or memory 1010 elements. Processor 1040 may use the input data to determine which algorithms to implement to process incoming data. Control logic 1030 and memory 1010 may be configured to perform one or more required algorithms and/or process the received data.

Configured control logic 1030 and memory 1010 can be used to implement a selected algorithm using datapath 1020. The processed output from datapath 1020 may be written to memory 1010 directly or via bus 1070. After or before processor 1040 determines that an algorithm has completed or is about to complete, processor 1040 may instruct transmitter 1050 to read data out of memory 1010 directly or via bus 1070 and convert the data to place it in condition for transmission through channel out 1090.

One skilled in the art will appreciate the scalability and flexibility of transceiver system 1000. For example, if the system should provide processing of a larger data set, datapath 1020 can be duplicated to provide more processing power. Control logic 1030 may not require change since it provides the same instructions only, when a larger data set is present, to more datapath elements resulting in more data being processed. Any number of additional fixed datapath elements can be added to meet the demands of a given scenario.

Similarly, the fixed datapath may not need to be changed if a small improvement is required in the implementation of an algorithm. In such a scenario, the control registers would be updated and the control signals provided to the datapath would implement the improvement. Hence a scalable and flexible transceiver architecture has been provided in accordance with the teachings of this invention.

As discussed previously, each datapath should form a basic unit of deliverable resource of processing power. The architecture can be scalable, and can include one or more datapath elements if needed. The datapaths may form an array of processing blocks each operating independently. This may enable the datapath to be swapped in and out with minimal design effort and changes. Such an arrangement can provide extra flexibility in designing the system when the requirements are still evolving. Furthermore, additional datapath elements can simply be added or removed in order to provide the adequate amount of processing power.

In fixed point implementations, different algorithms would have different precision requirements. The bit slicing and accumulator may be operative to handle such requirements. With different algorithms being processed, the bit slicing and the accumulator may preferably select different range of bits to write back to the user data memory.

It should be understood that the foregoing is only illustrative of the principles of the invention, and that the invention can be practiced by other than the described embodiments and aspects of the invention, which are presented for purposes of illustration and not of limitation, and the present invention is limited only by the claims which follow.

What is claimed is:

1. A method of programmably configuring a transceiver having a programmable processor, the method comprising:
    identifying an algorithm that is required by the transceiver;
    selecting a programmable control element from a plurality of programmable control elements based on the identification, wherein each programmable control element:
      includes a control register,
      computes a control signal using circuitry unique to the programmable control element, relative to the other programmable control elements, based on a value stored in the control register of the programmable control element, and
      outputs the computed control signal in parallel with other programmable control elements;
    configuring the control register included in the selected programmable control element;
    providing the control signal output by the selected programmable control element to a datapath, wherein the datapath:
      includes a bit slicing memory coupled to the control signal output by the selected programmable control element, and
      includes an accumulator coupled to the bit slicing memory, wherein the bit slicing memory is operative to select a bit-shifted output of the accumulator, and wherein the output of the accumulator is fed back to the datapath; and
    processing data in the datapath along a computation path selected by the control signal, wherein said control register of a first of the plurality of programmable control elements and said control register of a second of the plurality of programmable control elements are collectively programmed to shift processing time from said first of the plurality of programmable control elements to said second of the plurality of programmable control elements.

2. The method of claim 1 wherein said configuring the control register further comprises storing a plurality of parameters for the algorithm.

3. The method of claim 1 further comprising:
    providing a first signal to an algorithm control logic block included in the selected programmable control element, wherein said algorithm control logic block computes said control signal output by the selected programmable control element based on the first signal, wherein said algorithm control logic block corresponds to the algorithm.

4. The method of claim 3 wherein said first signal is provided by said control register included in the selected programmable control element.

5. The method of claim 3 wherein said algorithm control logic block provides said control signal output by the selected programmable control element to the datapath.

6. The method of claim 1 wherein the datapath comprises at least one of a memory, an input switch network, and a processing element, wherein the output of the accumulator is fed back to the processing element.

7. The method of claim 6, wherein said at least one of the memory, the input switch network, and the processing element are provided during said processing data in the datapath.

8. The method of claim 6 wherein said control signal output by the selected programmable control element is coupled to said at least one of the memory, the input switch network, and the processing element.

9. The method of claim 1 further comprising configuring a coefficient memory with values corresponding to the algorithm.

10. The method of claim 1 wherein the datapath comprises first and second processing elements operative to receive said control signal output by the selected programmable control element, wherein the output of the accumulator is fed back to one of the first and second processing elements, wherein the first processing element receives a first subset of data, and wherein the second element receives a second subset of data.

11. A system for programmably configuring a transceiver having a programmable processor, the system comprising:
    means for identifying an algorithm that is required by the transceiver;
    means for selecting a programmable control element from a plurality of programmable control elements based on the identification, wherein each programmable control element:
      includes a control register means,
      computes a control signal using circuitry unique to the programmable control element, relative to other programmable control elements, based on a value stored in the control register means of the programmable control element, and
      outputs the computed control signal in parallel with other programmable control elements;
    means for configuring the control register means included in the selected programmable control element;
    means for providing the control signal output by the selected programmable control element to a datapath, wherein the datapath:
      includes a bit slicing memory coupled to the control signal output by the selected programmable control element, and
      includes an accumulator coupled to the bit slicing memory, wherein the bit slicing memory is operative to select a bit-shifted output of the accumulator, and wherein the output of the accumulator is fed back to the datapath; and
    means for processing data in the datapath along a computation path selected by the control signal a2, wherein said control register means of a first of the plurality of programmable control elements and said control register means of a second of the plurality of programmable control elements are collectively programmed to shift processing time from said first of the plurality of programmable control elements to said second of the plurality of programmable control elements.

12. The system of claim 11 wherein said means for configuring said control register means further comprises means for storing a plurality of parameters for said algorithm.

13. The system of claim 11 further comprising:
means for providing a first signal to an algorithm control logic block means included in the selected programmable control element, wherein said algorithm control logic block means computes said control signal output by the selected programmable control element based on the first signal, said algorithm control logic block means corresponds to said algorithm.

14. The system of claim 13 wherein said first signal is provided by said control register means included in the selected programmable control element.

15. The system of claim 13 wherein said algorithm control logic block means provides said control signal output by the selected programmable control element to said datapath.

16. The system of claim 11 wherein the datapath comprises at least one of a memory, an input switch network, and a processing element, wherein the output of the accumulator is fed back to the processing element.

17. The system of claim 16 wherein said control signal output by the selected programmable control element is coupled to said at least one of the memory, the input switch network, and the processing element.

18. The system of claim 11 further comprising means for configuring a coefficient memory with values corresponding to said algorithm.

19. The system of claim 11 wherein the datapath comprises providing first and second processing elements operative to receive said control signal output by the selected programmable control element, wherein the output of the accumulator is fed back to one of the first and second processing elements, wherein the first processing element receives a first subset of data, and wherein the second element receives a second subset of data.

20. A programmable transceiver comprising:
a plurality of programmable logic control elements, each of said programmable logic control elements:
  includes a programmable logic control register,
  computes a control signal using circuitry unique to the programmable logic control element, relative to the other programmable logic control elements, based on a value stored in the programmable logic control register of the programmable logic control element, and
  outputs the computed control signal in parallel with other programmable logic control elements;
a global control element operable to:
  select one of said programmable logic control elements in response to identifying an algorithm that is required by the programmable transceiver; and
  configure said programmable logic control register included in said selected programmable logic control element to implement the algorithm;
a selector operable to:
  receive the control signals from each of said programmable logic control elements; and
  select the control signal of the selected one of said programmable logic control elements for output to a datapath; wherein:
the datapath includes at least one processing element operable to process data along a computation path selected by the control signal output by the selector,
a bit slicing memory coupled to the control signal output by the selected programmable logic control element, and
an accumulator coupled to the bit slicing memory, wherein the bit slicing memory is operative to select a bit-shifted output of the accumulator, and wherein the output of the accumulator is fed back to the at least one processing element, wherein said programmable logic control register of a first of the plurality of programmable logic control elements and said programmable logic control register of a second of the plurality of programmable logic control elements are collectively programmed to shift processing time from said first of the plurality of programmable logic control elements to said second of the plurality of programmable logic control elements.

21. The programmable transceiver of claim 20 wherein said programmable logic control register stores a plurality of parameters for said algorithm.

22. The programmable transceiver of claim 20 further comprising:
an algorithm control logic block operable to receive an input signal, wherein said algorithm control logic block is included in the selected programmable logic control element, wherein said algorithm control logic block computes said control signal provided by the selected one of the programmable logic control elements based on the input signal, wherein said algorithm control logic block corresponds to said algorithm.

23. The programmable transceiver of claim 22 wherein said algorithm control logic block is coupled to said programmable logic control register included in the selected one of the programmable logic control elements and receives said input signal from said programmable logic control register included in the selected one of the programmable logic control elements.

24. The programmable transceiver of claim 22 further comprising a global control logic block coupled to said algorithm control logic block and operable to provide said input signal, wherein said input signal comprises a count value.

25. The programmable transceiver of claim 22 wherein said algorithm control logic block is coupled to said selector and operable to provide said control signal output by the selected one of said programmable logic control elements to said selector.

26. The programmable transceiver of claim 20 further comprising a global control logic block coupled to a select input of said selector and operable to select an algorithm control signal input of said selector.

27. The programmable transceiver of claim 20 further comprising an input switch network having an input coupled to a memory and an output coupled to another element of said datapath.

28. The programmable transceiver of claim 27 wherein said input switch network is coupled to an output of said selector.

29. The programmable transceiver of claim 27, wherein said memory comprises a coefficient memory that stores values corresponding to said algorithm and a user data memory that stores values communicated to the transceiver and values that are output from said datapath.

30. The programmable transceiver of claim 20, wherein said at least one processing element is a complex logic unit.

31. The programmable transceiver of claim 20 wherein the datapath further comprises:
a second processing element operative to process data along a computation path selected by said control signal output by the selected one of said programmable logic control elements, wherein one of the at least one processing elements processes a first subset of data, and wherein the second processing element processes a second subset of data.

32. The programmable transceiver of claim 31 wherein the second processing element is configured while one of the at least one processing elements processes data.

33. A method of programmably operating a transceiver having a programmable processor, the method comprising:
provide a datapath comprising a computation path;
identifying an algorithm that is required by the transceiver;
configuring a first and a second programmable control element based on the identified algorithm, said first programmable control element computes a first control signal using first circuitry unique to said first programmable control element, relative to said second programmable control element, based on a value stored in a first programmable control register of the first programmable control element, and outputs the first control signal and said second programmable control element computes a second control signal using second circuitry unique to said second programmable control element, relative to said first programmable control element, based on a value stored in a second programmable control register of the second programmable control element, and outputs the second control signal, wherein the first and the second control signals are output in parallel;
selectively coupling said datapath to one of said first control signal and said second control signal, wherein the datapath:
includes a bit slicing memory coupled to the one of said first control signal and said second control signal, and
includes an accumulator coupled to the bit slicing memory, wherein the bit slicing memory is operative to select a bit-shifted output of the accumulator, and wherein the output of the accumulator is fed back to the datapath; and
processing data in said datapath along said computation path determined by said selectively coupled control signal, wherein said first programmable control register of the first programmable control element and said second programmable control register of the second programmable control element are collectively programmed to shift processing time from the first programmable control element to the second programmable control element.

34. The method of programmably operating a transceiver as defined by claim 33, wherein said datapath comprises computation path selection circuitry.

35. The method of programmably operating a transceiver as defined by claim 33, wherein said selectively coupling said datapath further comprises:
coupling said first and second control signals to a selection circuit; and
providing a selection signal to said selection circuit, wherein said selection signal determines which of said first and second control signals are coupled to said datapath.

36. The method of programmably operating a transceiver as defined by claim 33, further comprising:
providing a first input signal from the first programmable control register included in said first programmable control element to a first algorithm control logic block included in said first programmable control element; and
providing a second input signal from the second programmable control register included in said second programmable control element to a second algorithm control logic block included in said second programmable control element,
wherein said first algorithm control logic block is operable to provide said first control signal and said second algorithm control logic block is operable to provide said second control signal.

37. A system for programmably configuring a transceiver having a programmable processor, the system comprising:
means for providing a datapath comprising a computation path;
means for identifying an algorithm that is required by the transceiver;
means for configuring a first and a second programmable control elements based on the identified algorithm, said first programmable control element computes a first control signal using first circuitry unique to said first programmable control element, relative to said second programmable control element, based on a value stored in a first programmable control register of the first programmable control element, and outputs the first control signal and said second programmable control element computes a second control signal using second circuitry unique to said second programmable control element, relative to said first programmable control element, based on a value stored in a second programmable control register of the second programmable control element, and outputs the second control signal, wherein the first and the second control signals are output in parallel;
means for selectively coupling said datapath to one of said first control signal and said second control signal, wherein the datapath:
includes a bit slicing memory coupled to the one of said first control signal and said second control signal, and
includes an accumulator coupled to the bit slicing memory, wherein the bit slicing memory is operative to select a bit-shifted output of the accumulator, and wherein the output of the accumulator is fed back to the datapath; and
means for processing data in said datapath along said computation path determined by said selectively coupled control signal, wherein said first programmable control register of the first programmable control element and said second programmable control register of the second programmable control element are collectively programmed to shift processing time from the first programmable control element to the second programmable control element.

38. The system as defined by claim 37, wherein said selectively coupling said datapath further comprises:
means for coupling said first and second control signals to a selection circuit; and
means for providing a selection signal to said selection circuit, wherein said selection signal determines which of said first and second control signals are coupled to said datapath.

39. The system as defined by claim 37, further comprising:
means for providing a first input signal from the first programmable control register included in said first programmable control element to a first algorithm control logic block means included in said first programmable control element; and
means for providing a second input signal from the second programmable control register included in said second programmable control element to a second algorithm control logic block means included in said second programmable control element,
wherein said first algorithm control logic block means is operable to provide said first control signal and said second algorithm control logic block means is operable to provide said second control signal.

40. A programmable transceiver comprising:
a datapath comprising a computation path and a plurality of processing elements placed within said computation path;
a global control element operable to:
identify an algorithm that is required by the programmable transceiver; and
configure a first and a second programmable control element based on the identified algorithm, said first programmable control element computes a first control signal using first circuitry unique to said first programmable control element, relative to said second programmable control element, based on a value stored in a first programmable control register of the first programmable control element, and outputs the first control signal and said second programmable control element computes a second control signal using second circuitry unique to said second programmable control element, relative to said first programmable control element, based on a value stored in a second programmable control register of the second programmable control element, and outputs the second control signal, wherein the first and the second control signals are output in parallel;
a selector operative to selectively couple said datapath to one of said first control signal and said second control signal; and
a processing element of said plurality of processing elements being operative to process data in said datapath along said computation path determined by said selectively coupled control signal, wherein the datapath further comprises:
a bit slicing memory coupled to the one of said first control signal and said second control signal, and
an accumulator coupled to the bit slicing memory, wherein the bit slicing memory is operative to select a bit-shifted output of the accumulator, and wherein the output of the accumulator is fed back to the processing element, wherein said first programmable control register of the first programmable control element and said second programmable control register of the second programmable control element are collectively programmed to shift processing time from the first programmable control element to the second programmable control element.

41. The programmable transceiver as defined by claim 40, wherein said datapath comprises computation path selection circuitry.

42. The programmable transceiver as defined by claim 40, wherein said global control element is further operative to:
couple said first and second control signals to a selection circuit; and
provide a selection signal to said selector, wherein said selection signal determines which of said first and second control signals are coupled to said datapath.

43. The programmable transceiver as defined by claim 40, further comprising:
the first programmable control register included in said first programmable control element operative to provide a first input signal to a first algorithm control logic block included in said first programmable control element; and
the second programmable control register included in said second programmable control element operative to provide a second input signal to a second algorithm control logic block included in said second programmable control element,
wherein said first algorithm control logic block is operable to provide said first control signal and said second algorithm control logic block is operable to provide said second control signal.

44. The method of claim 1, wherein the programmable control element is selected by a global control element, further comprising providing an operation status signal from the selected programmable control element to the global control element.

45. The programmable transceiver of claim 20 wherein said selected programmable logic control element provides an operation status signal to said global control element.

46. The method of claim 33, wherein the first and second programmable control elements are configured by a global control element, further comprising providing an operation status signal from one of the first and second programmable control elements to the global control element.

47. The method of claim 33, wherein the first and second programmable control elements are configured by a global control element, further comprising providing a bidirectional communications path between the configured programmable control elements and the global control element.

48. The programmable transceiver of claim 40 wherein one of said first and second programmable control elements provides an operation status signal to said global control element.

49. The method of claim 1, wherein the control signal is provided to the datapath through a control signal communications path that is (1) shared by the respective control signals output by each of the programmable control elements, and (2) used by only one of the respective control signals at any one time.

50. The system of claim 11 wherein the control signal is provided to the datapath through a control signal communications path that is (1) shared by the respective control signals output by each of the programmable control elements, and (2) used by only one of the respective control signals at any one time.

51. The programmable transceiver of claim 20, wherein the control signal output by the selector is output to the datapath through a control signal communications path that is (1) shared by the respective control signals output by each of the programmable logic control elements, and (2) used by only one of the respective control signals at any one time.

52. The method of claim 33, wherein said first control signal and said second control signal are selectively coupled to the datapath through a control signal communications path that is (1) shared by the first and second control signals, and (2) used by only one of the first and second control signals at any one time.

53. The system of claim 37, wherein said first control signal and said second control signal are selectively coupled to the datapath through a control signal communications path that is (1) shared by the first and second control signals, and (2) used by only one of the first and second control signals at any one time.

54. The programmable transceiver of claim 40, wherein said first control signal and said second control signal are selectively coupled to the datapath through a control signal communications path that is (1) shared by the first and second control signals, and (2) used by only one of the first and second control signals at any one time.

55. The method of claim 1 wherein:
a first programmable control element of the plurality of programmable control elements includes a first control logic operable to complete a first operation within a first amount of processing time, wherein the first amount of processing time is less than a programmed availability of the datapath to the first control logic, a second programmable control element of the plurality of programmable control elements further includes a second control logic operable to complete a second operation within a second amount of processing time, wherein the second amount of processing time is greater than a programmed availability of the datapath to the second control logic, and the control register included in the first programmable control element and the control register included in the second programmable control element collectively cause the shifting of a difference of the first amount of processing time and the programmed availability of the datapath to the first control logic from the first control logic to the second control logic.

56. The system of claim 11 wherein:

a first programmable control element of the plurality of programmable control elements includes a first control logic means operable to complete a first operation within a first amount of processing time, wherein the first amount of processing time is less than a programmed availability of the datapath to the first control logic means, a second programmable control element of the plurality of programmable control elements further includes a second control logic means operable to complete a second operation within a second amount of processing time, wherein the second amount of processing time is greater than a programmed availability of the datapath to the second control logic means, and the control register means included in the first programmable control element and the control register means included in the second programmable control element collectively cause the shifting of a difference of the first amount of processing time and the programmed availability of the datapath to the first control logic means from the first control logic means to the second control logic means.

57. The programmable transceiver of claim 20 wherein:

a first programmable logic control element of the plurality of programmable logic control elements includes a first control logic operable to complete a first operation within a first amount of processing time, wherein the first amount of processing time is less than a programmed availability of the datapath to the first control logic, a second programmable logic control element of the plurality of programmable logic control elements further includes a second control logic operable to complete a second operation within a second amount of processing time, wherein the second amount of processing time is greater than a programmed availability of the datapath to the second control logic, and the programmable logic control register included in the first programmable logic control element and the programmable logic control register included in the second programmable logic control element collectively cause the shifting of a difference of the first amount of processing time and the programmed availability of the datapath to the first control logic from the first control logic to the second control logic.

* * * * *